United States Patent
Hyodo et al.

(10) Patent No.: US 8,380,408 B2
(45) Date of Patent: Feb. 19, 2013

(54) SPEED CHANGE CONTROL SYSTEM FOR INDUSTRIAL VEHICLE

(75) Inventors: Koji Hyodo, Tsuchiura (JP); Tetsuji Tanaka, Abiko (JP); Eiichi Sakai, Ryugasaki (JP); Nobuhiro Suzuki, Ryugasaki (JP); Koji Takano, Tsuchiura (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 402 days.

(21) Appl. No.: 12/516,965

(22) PCT Filed: Nov. 30, 2007

(86) PCT No.: PCT/JP2007/073220
§ 371 (c)(1),
(2), (4) Date: May 29, 2009

(87) PCT Pub. No.: WO2008/066170
PCT Pub. Date: Jun. 5, 2008

(65) Prior Publication Data
US 2010/0071987 A1 Mar. 25, 2010

(30) Foreign Application Priority Data
Nov. 30, 2006 (JP) .................................. 2006-323031

(51) Int. Cl.
*F16H 61/00* (2006.01)
*G06F 19/00* (2011.01)

(52) U.S. Cl. ................ 701/64; 701/51; 701/70; 477/34; 477/48; 477/125; 477/905

(58) Field of Classification Search ............. 701/51, 701/70, 64; 477/34, 48, 125, 905
See application file for complete search history.

(56) References Cited

U.S. PATENT DOCUMENTS
(Continued)

FOREIGN PATENT DOCUMENTS
EP   0 467 233 A2   1/1992
EP   1 959 169 A1   8/2008
(Continued)

OTHER PUBLICATIONS
European Search Report dated Oct. 5, 2010 (eight (8) pages).
(Continued)

*Primary Examiner* — Thomas Black
*Assistant Examiner* — Sara Lewandroski
(74) *Attorney, Agent, or Firm* — Crowell & Moring LLP

(57) ABSTRACT

A speed change control system for an industrial vehicle includes: a speed ratio detecting unit that detects a speed ratio of speeds of an input shaft and of an output shaft of a torque converter; a torque converter speed ratio-based speed changer that shifts up or shifts down a speed stage of a transmission 3 in response to the detected speed ratio; a vehicle speed detection unit that detects a speed of the vehicle; a mode selection unit that selects any one of an L-mode and an H-mode; and a speed change control unit that permits an upshift provided that the vehicle speed is equal to or higher than a first predetermined value when the L-mode is selected whereas permits the upshift provided that the vehicle speed is higher than another predetermined value which is larger that the predetermined value when the H-mode is selected.

15 Claims, 12 Drawing Sheets

U.S. PATENT DOCUMENTS

| | | | |
|---|---|---|---|
| 2,943,502 A | | 7/1960 | Perkins et al. |
| 4,977,797 A | | 12/1990 | Aoki et al. |
| 5,016,175 A | * | 5/1991 | Baltusis et al. ............... 701/58 |
| 5,341,703 A | * | 8/1994 | Palansky et al. ............... 477/65 |
| 5,611,753 A | | 3/1997 | Kondo et al. |
| 5,791,541 A | | 8/1998 | Jitsuishi et al. |
| 5,951,437 A | * | 9/1999 | Yuasa et al. ............... 477/46 |
| 5,991,679 A | * | 11/1999 | Sigg ............................ 701/62 |
| 5,999,873 A | | 12/1999 | Minowa et al. |
| 6,098,002 A | * | 8/2000 | Horiguchi et al. ............ 701/51 |
| 6,098,004 A | * | 8/2000 | Grytzelius et al. ............ 701/55 |
| 6,246,940 B1 | * | 6/2001 | Ochiai et al. .................. 701/51 |
| 6,272,415 B1 | | 8/2001 | Tanaka et al. |
| 6,595,898 B2 | * | 7/2003 | Kobayashi et al. ........... 477/174 |
| 6,695,742 B2 | * | 2/2004 | Hagiwara et al. ............. 477/46 |
| 7,742,863 B2 | * | 6/2010 | Brattberg ...................... 701/51 |
| 2001/0044358 A1 | | 11/2001 | Taniguchi et al. |
| 2002/0062186 A1 | | 5/2002 | Abiru |
| 2002/0082759 A1 | | 6/2002 | Katakura et al. |
| 2003/0034653 A1 | | 2/2003 | Kitajima et al. |
| 2003/0158646 A1 | | 8/2003 | Nishida et al. |
| 2004/0080273 A1 | | 4/2004 | Ito et al. |
| 2004/0157701 A1 | | 8/2004 | Legner |
| 2005/0183416 A1 | | 8/2005 | Hayashi et al. |
| 2006/0235596 A1 | | 10/2006 | Suzuki et al. |
| 2006/0238020 A1 | | 10/2006 | Nitta et al. |
| 2007/0105682 A1 | | 5/2007 | Inuta |
| 2007/0208478 A1 | | 9/2007 | Takamatsu |
| 2008/0004159 A1 | * | 1/2008 | Kubonoya et al. ............ 477/115 |
| 2009/0018730 A1 | | 1/2009 | Tarasinski et al. |
| 2009/0038186 A1 | | 2/2009 | Osswald et al. |
| 2009/0240405 A1 | * | 9/2009 | Tawara ........................... 701/52 |

FOREIGN PATENT DOCUMENTS

| | | | |
|---|---|---|---|
| GB | 2 155 568 A | | 9/1985 |
| JP | 61-52428 A | | 3/1986 |
| JP | 61-244954 A | | 10/1986 |
| JP | 64-6551 A | | 1/1989 |
| JP | 6-34029 A | | 2/1994 |
| JP | 10-169766 A | | 6/1998 |
| JP | 2000-213636 A | | 8/2000 |
| JP | 2000-304126 A | | 11/2000 |
| JP | 2000304126 A | * | 11/2000 |
| JP | 3388594 B2 | | 1/2003 |
| WO | WO 2008/066171 A1 | | 6/2008 |

OTHER PUBLICATIONS

European Search Report dated Oct. 5, 2010 (eleven (11) pages).

International Search Report dated Feb. 5, 2008 (two (2) pages).

Henry J. Wirry, "Torque converter", AccessScience, 2008, McGraw-Hill Companies, http://www.accessscience.com. (Two (2) pages).

U.S. Office Action dated Feb. 16, 2012 of copending U.S. Appl. No. 12/516,976.

US Office Action, dated Aug. 14, 2012, in co-pending U.S. Appl. No. 12/516,976.

* cited by examiner

FIG. 4
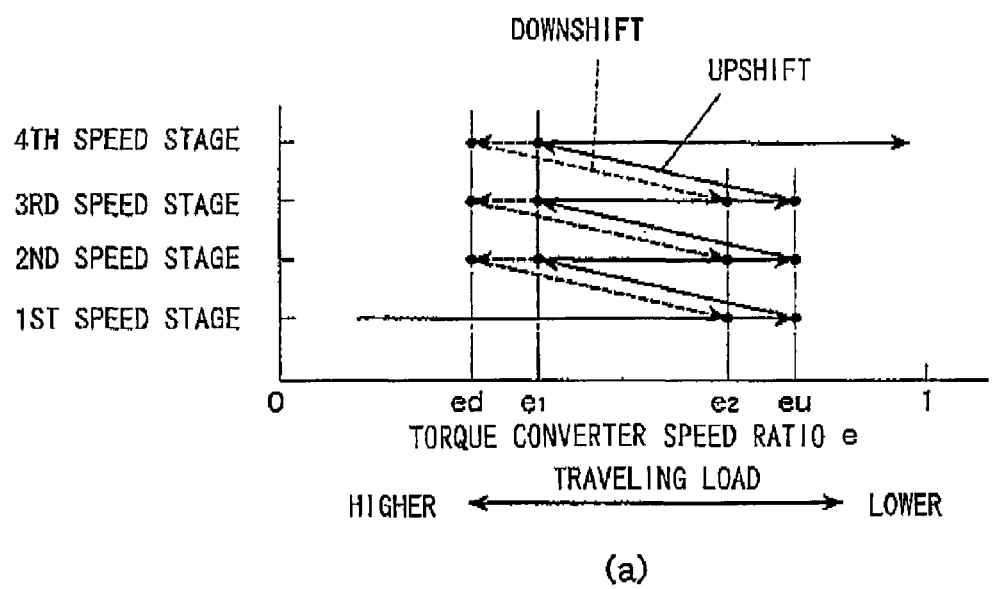
(a)
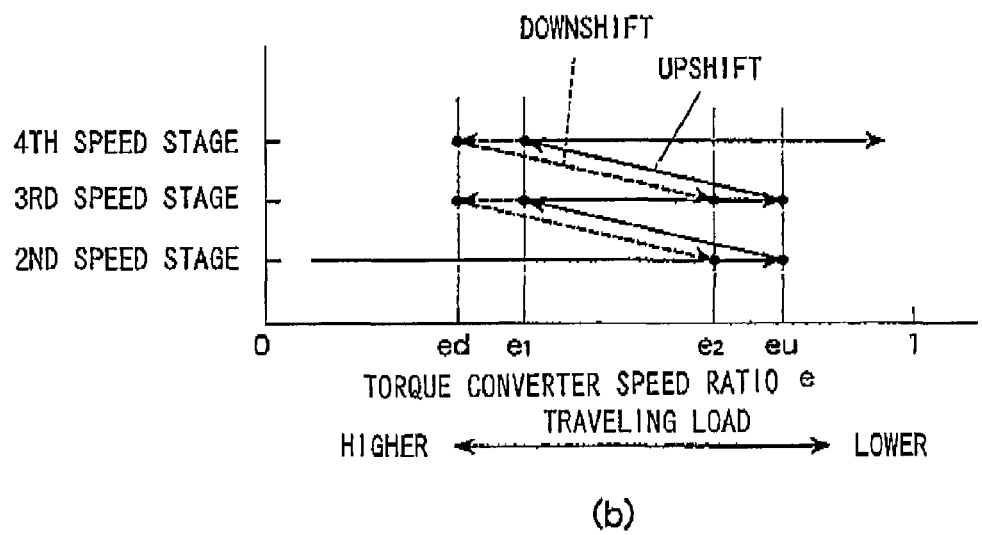
(b)

SPEED CHANGE CONTROL SYSTEM FOR INDUSTRIAL VEHICLE

TECHNICAL FIELD

The present invention relates to a speed change control system for an industrial vehicle such as a wheel loader.

BACKGROUND ART

Hitherto, a device is known that transmits an output torque of an engine to a transmission through a torque converter (for instance, refer to Patent Document 1). The device described in this Patent Document 1 calculates a speed ratio, which is a ratio of rotation speeds on an input shaft side and an output shaft side of the torque converter, and automatically shifts up or down the transmission, when the speed ratio reaches a predetermined value set beforehand.
Patent Document 1: Japanese Patent No. 3386594

SUMMARY OF THE INVENTION

Problem to be Solved by the Invention

However, the transmission shifts up automatically in the device described in the above-mentioned Patent Document 1 when the torque converter speed ratio is large. Therefore, the transmission shifts up undesirably even if the vehicle is approaching to a truck in a low speed with the speed step lowered so as to load loads, for instance, earth and sand etc., into the truck. As a result, the speed of the vehicle could sometimes rise. Therefore, the driver had to approach the truck while operating the brake pedal and a complex operation was necessary.

Means or Solving the Problem

A speed change control system for an industrial vehicle according to the present invention comprises: a speed ratio detecting unit that detects a speed ratio of speeds of an input shaft and of an output shaft of a torque converter; a torque converter speed ratio-based speed changer that shifts up or shifts down a speed stage of a transmission in response to the detected speed ratio; a vehicle speed detection unit that detects a vehicle speed; and a speed change control unit that permits an upshift by the torque converter speed ratio-based speed changer provided that the vehicle speed detected by the vehicle speed detection unit is equal to or higher than a predetermined value.

It is preferred that there is further provided a mode selection unit that selects any one of a first gearshift mode and a second gearshift mode, wherein the speed change control unit permits the upshift provided that the vehicle speed detected by the vehicle speed detection unit is equal to or higher than a first predetermined value when the first gearshift mode is selected by the mode selection unit, and permits the upshift provided that the vehicle speed detected by the vehicle speed detection unit is equal to or higher than a second predetermined value, which is larger than the first predetermined value when the second gearshift mode is selected by the mode selection unit.

The speed change control system for an industrial vehicle according to the present invention comprises: a speed ratio detecting unit that detects a speed ratio of rotation speeds of an input shaft and of an output shaft of a torque converter; a torque converter speed ratio-based speed changer that shifts up or shifts down a speed stage of a transmission in response to the detected speed ratio; a vehicle speed detection unit that detects a vehicle speed; a vehicle speed-based speed changer that permits shifts up or shifts down a speed stage of a transmission in response to the detected vehicle speed; a mode selection unit that selects any one of a first gearshift mode and a second gearshift mode; a speed change control unit that performs shifting by the torque converter speed ratio-based speed changer if the first gearshift mode is selected by the mode selection unit and performs shifting by the vehicle speed-based speed changer if the second gearshift mode is selected by the mode selection unit.

There may be further provided a lowest speed stage selection unit that selects any one of a mode whose lowest speed stage is a 1st speed and a mode whose lowest speed stage is a 2nd speed, wherein the speed change control unit limits the lowest speed stage of the transmission according to the mode selected by the lowest speed stage selection unit.

There may be provided a clutch cutting mechanism that connects and releases a clutch for traveling according to an brake operation, and a clutch cutting detection unit that detects an operation state of the clutch cutting mechanism, wherein the speed change control unit permits the upshift when a connection of the clutch is detected by the clutch cutting detection unit, and prohibits the upshift when a release of the clutch is detected by the clutch cutting detection unit.

There may be provided a braking detection unit that detects an operation of a braking device for traveling, wherein the speed change control system limits the lowest speed stage of the downshift by the torque converter speed ratio-based speed changer to the 2nd speed when the operation of the braking device is detected by the braking detection unit.

There may be provided an accelerator operation amount detection unit that detects an operation amount of an accelerator pedal, wherein the speed change control unit requires for permitting a downshift to a 1st speed that the operation amount of stepping on of the accelerator pedal equal to or more than a predetermined value is detected by the accelerator operation amount detection unit.

In this case, it is preferred that the speed change control unit requires for permitting the downshift to the 1st speed that the operation amount of stepping on of the accelerator pedal equal to or more than the predetermined value is continued for a predetermined time.

There may be required for permitting an upshift a condition that the operation amount of stepping on of the accelerator pedal equal to or more than a predetermined value is detected by the accelerator operation amount detection unit, and the upshift may be prohibited if the operation amount of stepping on of the accelerator pedal equal to or more than the predetermined value is not detected.

In this case, it is preferred that there is required for permitting the upshift a condition that the operation amount of stepping on of the accelerator pedal equal to or more than the predetermined value is continued for a predetermined time.

A downshift may be performed regardless of the speed ratio detected by the speed ratio detection unit when the operation amount of stepping on of the accelerator pedal equal to or more than the predetermined value is not detected and the vehicle speed detected by the vehicle speed detection unit is equal to or lower than a predetermined value.

In this case, it is preferred that the speed change control unit limits a lowest speed stage upon the downshift to a 2nd speed.

There may be provided a start determination unit that determines whether the vehicle is in a startable state to control the transmission to a 2nd speed when it is determined by the start determination unit that the vehicle is in the startable state.

A speed change control system for an industrial vehicle according to the present invention comprises: a speed ratio detecting unit that detects a speed ratio of speeds of an input shaft and of an output shaft of a torque converter; a solenoid control unit that drives a solenoid for shifting a transmission in response to the detected speed ratio to shift up or shift down a speed stage of the transmission; a vehicle speed detection unit that detects a vehicle speed; a speed change control unit that permits an upshift provided that the vehicle speed detected by the vehicle speed detection unit is equal to or higher than a predetermined value; a mode selection unit that selects any one of a first gearshift mode and a second gearshift mode, wherein the speed change control unit includes an input unit to which signals from the mode selection unit and the vehicle speed detection unit are inputted; a determination unit that determines a selected gearshift mode based on the signals input in the input unit and determines whether the detected vehicle speed is equal to or higher than a first predetermined value, or equal to or higher than a second predetermined value which is larger than the first predetermined value; and an output unit that outputs a signal for permitting an upshift to the solenoid control unit provided that the vehicle speed is determined to be equal to or higher than the first predetermined value when it is determined by the determination unit that the first gearshift mode has been selected, whereas outputs the signal for permitting the upshift to the solenoid control unit provided that the vehicle speed is determined to be equal to or higher than the second predetermined value when it is determined that the second gearshift mode has been selected.

It is preferred that the speed change control system mentioned above is applied to an industrial vehicle that includes: four tires; a body supported by the tires and provided bendably; a front side frame and a rear side frame that constitute the body; an operator's cab provided in a front part of the rear side frame; an engine compartment provided in a rear part of the rear side frame; an arm provided rotatably in a vertical direction with respect to the front side frame; and a bucket provided rotatably at a front end of the arm.

Advantageous Effect of the Invention

According to the present invention, an upshift based on the torque converter speed ratio is permitted provided that the vehicle speed is equal to or higher than a predetermined value and hence traveling at a low speed stage can be maintained. Accordingly, works can be done while traveling at a low speed without need to operate the brake pedal.

BRIEF DESCRIPTION OF THE DRAWINGS

FIG. 4 is a diagram showing timing of gearshift by torque converter speed ratio-based control;

BEST MODE FOR CARRYING OUT THE INVENTION

The following is an explanation of a speed change control system according to a first embodiment of the present invention with reference to FIGS. 1 through 8.

Figure 1:
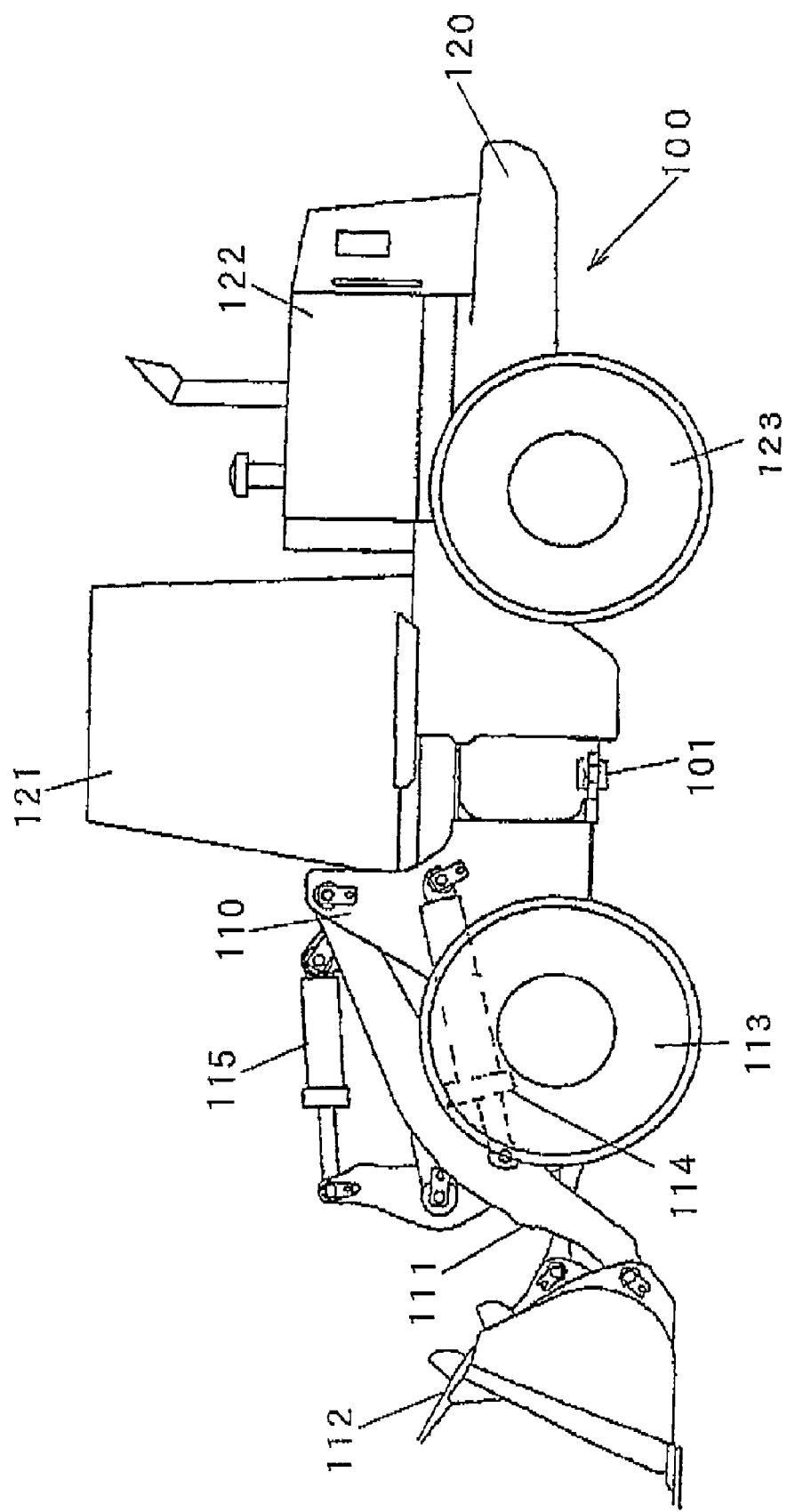
FIG. 1 is a side elevation of a wheel loader according to an embodiment of the present invention.

FIG. 1 is a side elevation of a wheel loader that is an example of an industrial vehicle to which the speed change control system according to the present embodiment is applied. A wheel loader 100 is constituted by a front body 110 possessing an arm 111, a bucket 112, and tires 113, etc., and a rear body 120 possessing a cab 121, an engine compartment 122, and tires 123, etc. The arm 111 turns in the vertical direction (faces upward and downward) as driven by an arm cylinder 114. The bucket 112 turns in the vertical direction (dumps or crowds) as driven by a bucket cylinder 115. The front body 110 and the rear body 120 are mutually linked by a center pin 101 to a free turn, and the front body 110 is bent with respect to the rear body 120 rightward and leftward, by the extension and retraction of a steering wheel cylinder (not shown).

Figure 2:
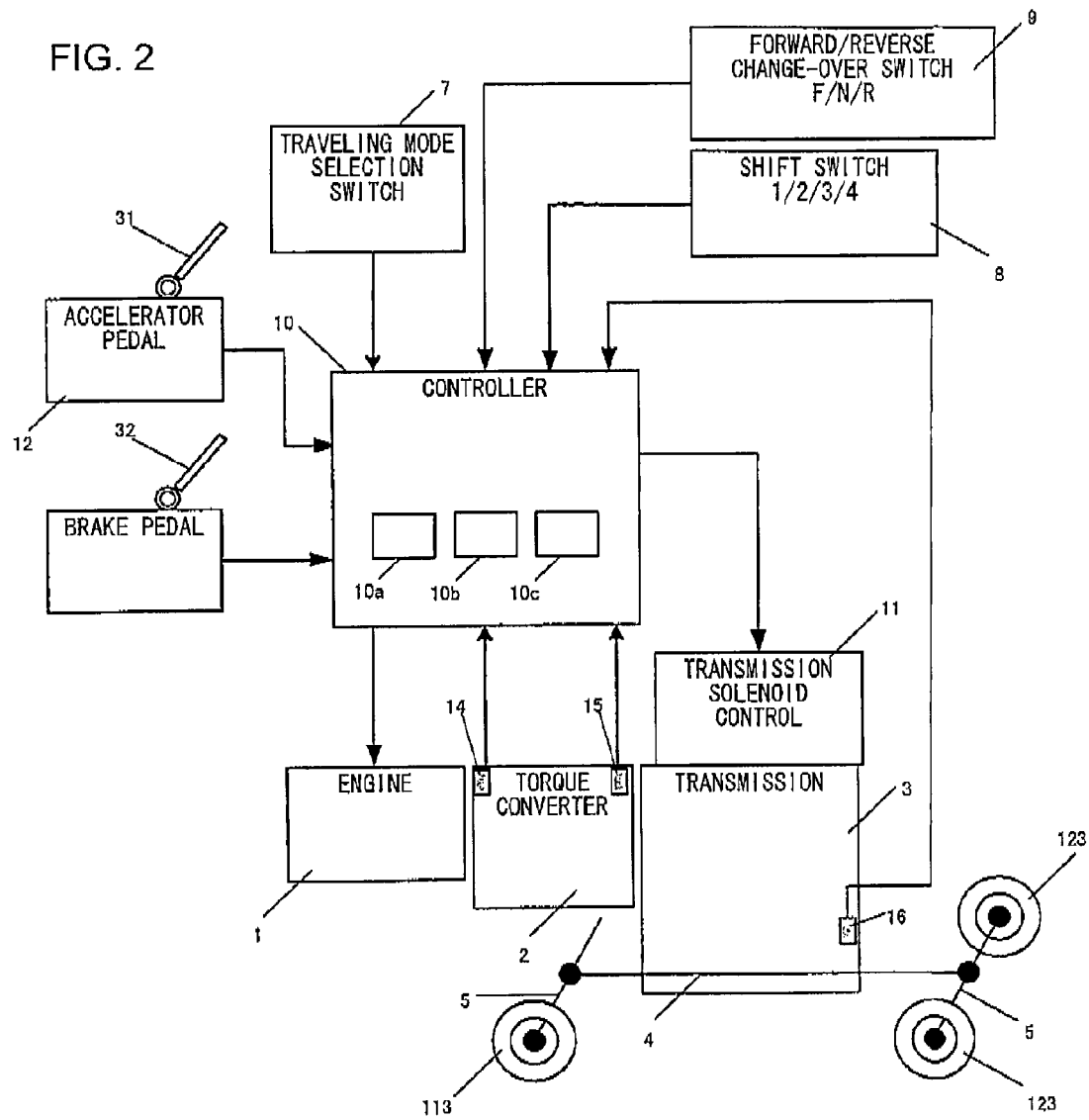
FIG. 2 is a schematic configuration diagram showing the speed change control system according to a first embodiment of the present invention.

FIG. 2 is a schematic configuration diagram showing the speed change control system according to the first embodiment. An input shaft of a torque converter (hereafter, "torque converter") 2 is linked to an output shaft of an engine 1, and an output shaft of the torque converter 2 is linked to a transmission 3. The torque converter 2 is a liquid clutch that includes an impeller, a turbine, and a stator, which are well-known. The rotation of the engine 1 is transmitted to the transmission 3 through the torque converter 2. The transmission 3 has a hydraulic pressure clutch that can change the speed stage between 1st speed and 4th speed, and the rotation speed of the output shaft of the torque converter 2 is changed by the transmission 3. The changed rotation is transmitted to the tires 113, 123 through a propeller shaft 4 and axles 5 to allow the vehicle to travel.

Figure 3:
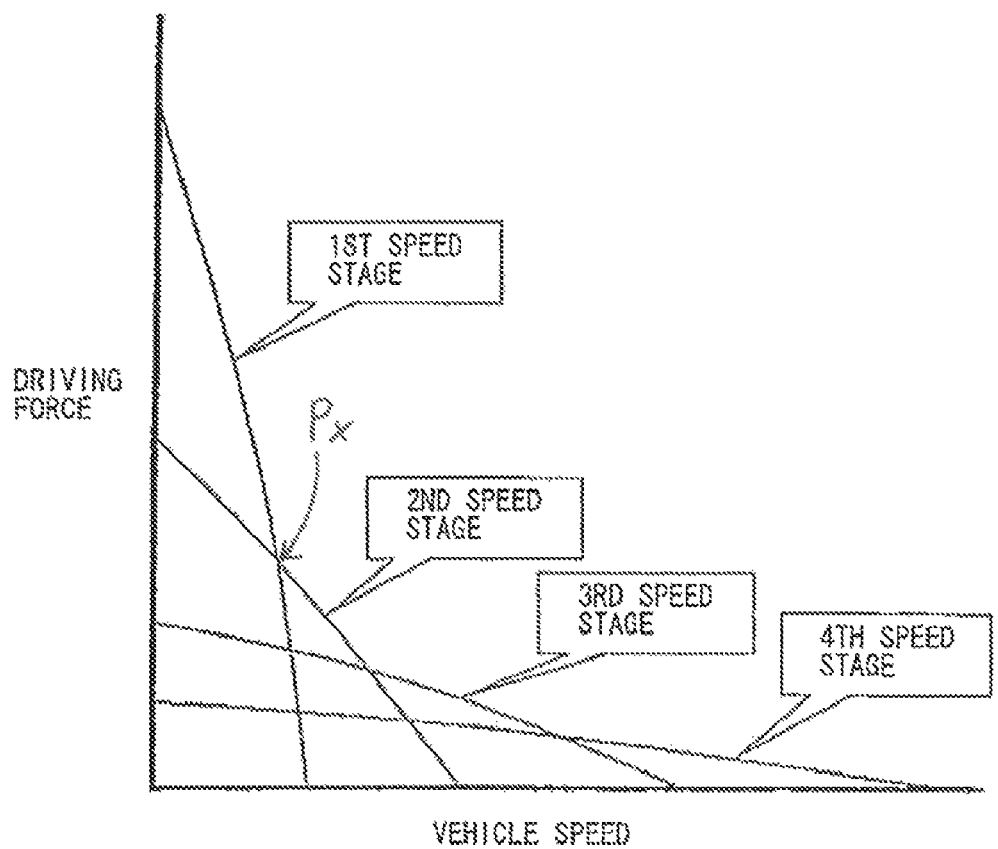
FIG. 3 is diagram illustrating the relationship between respective speed stages and driving forces.

The torque converter 2 has a function to increase the output torque relative to the input torque, that is, to increase a torque ratio by 1 or more. The torque ratio becomes smaller as a torque converter speed ratio "e", increases. The torque converter speed ratio "e" is a ratio of the rotation speeds of the input shaft and of the output shaft (output rotation speed/input rotation speed) of the torque converter 2. For instance, when the traveling load increases while the vehicle is traveling in a state where the engine rotation speed is constant, the rotation speed of the output shaft of the torque converter 2, that is, a vehicle speed decreases and the torque converter speed ratio "e" becomes smaller. On this occasion, the torque ratio increases, so that it becomes possible for the vehicle to travel with a bigger driving force (traction). The relationship between the vehicle speed and the driving force for each of the speed stages is as shown in FIG. 3. Assuming that comparison is made in the same speed stage, the driving force is larger at a lower speed of the vehicle (low-speed-high-torque), whereas the driving force becomes smaller at a faster speed of the vehicle (high-speed-low-torque). Moreover, a bigger driving force can be obtained in the same vehicle speed when the speed stage is lower.

The transmission 3 is an automatic transmission that includes solenoid-operated valves corresponding to respective speed stages. These solenoid operated valves are driven in response to a control signal output from a controller 10 to a solenoid control unit 11. That is, when the control signal is output by the controller 10, the solenoid control unit 11 outputs a control signal to the solenoid-operated valve according to the control signal from the controller 10 to drive the solenoid-operated valve. As a result, the speed stages are automatically changed among the 1st to the 9th speeds from one to another.

There are two methods for automatic speed change (gearshift) control, i.e. a torque converter speed ratio-based control that changes speed or gear when the torque converter speed ratio "e" reaches a predetermined value and a vehicle speed-based control that changes speed or gear when the speed of the vehicle reaches a predetermined value. In the first embodiment, the speed stages of the transmission 3 are controlled by the torque converter speed ratio-based control.

FIG. 4 shows diagrams illustrating timing of gearshift by the torque converter speed ratio-based control. FIG. 4(*a*) shows that gearshift is possible within the range of 1st speed to 4th speed, and FIG. 4(*b*) shows that gearshift is possible within the range of 2nd speed to 4th speed. The speed stage shifts up by one stage when the traveling load lowers to increase the torque converter speed ratio "e" to a predetermined value "eu" or higher. On the contrary, the speed stage shifts down by one stage when the traveling load rises to decrease the torque converter speed ratio "e" to a predetermined value "ed" or lower.

Figure 5:
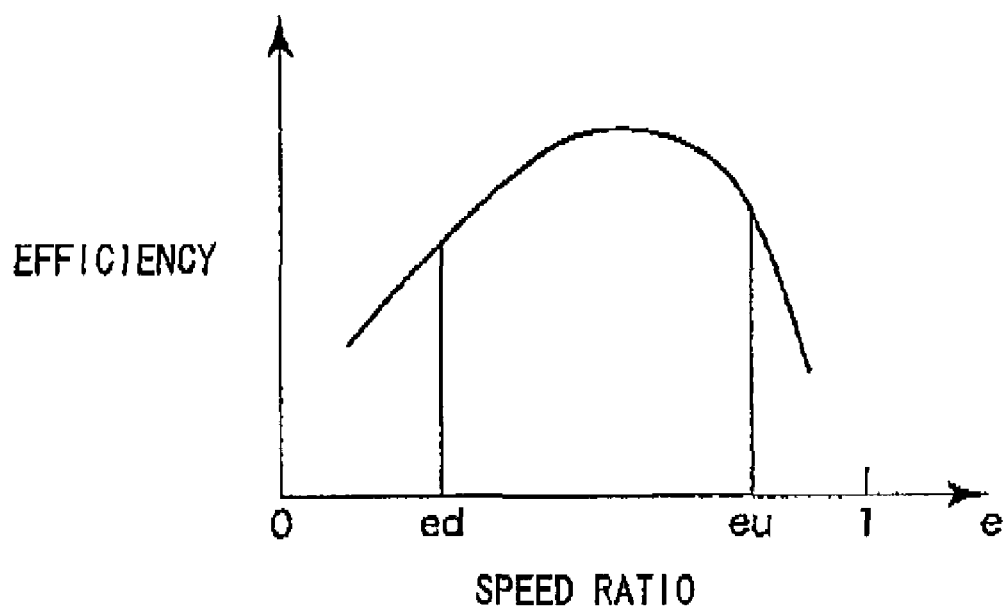
FIG. 5 is a diagram illustrating a relationship between torque converter speed ratio and torque converter efficiency.

The predetermined values "eu", "ed" are torque converter speed ratios on which gearshifts are based and are set beforehand by the controller 10. FIG. 5 is a diagram illustrating a relationship between the torque converter speed ratio "e" and the torque converter efficiency. A characteristic curve of the torque converter efficiency is substantially parabolic, and the torque converter is inefficient when the torque converter speed ratio "e" is about 0 and about 1 as shown in FIG. 5. Therefore, the predetermined values "eu", "ed" are set to, for instance, eu=0.8 and ed=0.3 in the present embodiment. A torque converter speed ratio "e1" immediately after shifting up is lower than the predetermined value "eu" (for instance, 0.4), whereas a torque converter speed ratio "e2" immediately after shifting down is higher than the predetermined value "ed" (for instance, 0.7).

Note that the predetermined values "eu", "ed" of the speed ratio "e" are set to a value of an intersection Px of the characteristic curve of the 1st speed stage and the characteristic curve of the 2nd speed stage in FIG. 3. Therefore, when the driving force decreases upon traveling at the 1st speed, and when the driving force reaches the intersection Px, there occurs an upshift to the 2nd speed. When the driving force increases upon traveling at the 2nd speed and then the driving force reaches the intersection Px, there occurs a downshift to the 1st speed. As a result, the speed stage is smoothly changed from the 1st speed to the 2nd speed or from the 2nd speed to the 1st speed, and there is little gearshift shook. On this occasion, the speed ratio "e" is almost constant regardless of the engine rotation speed although the characteristic curve of each of the speed stages shifts leftward when the engine rotation speed lowers and the intersection Px shifts in the direction of the arrow.

According to the above-mentioned torque converter speed ratio-based control, there is established e≧eu if the load is light even when the vehicle speed is low, and there occurs an upshift of the gears. Therefore, the timing of the upshift becomes earlier, and the torque converter speed ratio-based control excels in the point of fuel cost and the noise compared with the vehicle speed-based control. On the other hand, the torque converter speed ratio-based control could occasionally result in an upshift of gears against the mind of the operator who tries to drive the vehicle in the predetermined speed stage (traction). For instance, even if the operator intends to approach a truck by low speed traveling with setting the transmission gear ratio at the 2nd speed and to load earth and sand in the bucket etc. onto the truck, there may occur an upshift of gears to the 3rd speed or 4th speed when the load is light, so that it would not sometimes possible to approach the truck by low speed traveling. In the present embodiment, the speed change control system is configured as detailed below in order to avoid troubles according to the above-mentioned torque converter speed ratio-based control.

Referring to FIG. 2, the controller 10 is equipped with a calculation processing unit that includes CPU, ROM, RAM, and other peripheral circuits. The controller 10 includes an input unit 10*a* that inputs signals from various sensors or switches, a determination unit 10*b* that performs various determinations to be detailed later, and an output unit 10*c* that outputs control signals to the solenoid control unit 11 according to the result of the determination by the determination unit 10*b*. There are connected to the controller 10 an accelerator operation amount detector 12 that detects an operation amount A of an accelerator pedal 31, a brake operation amount detector 13 that detects an operation amount of a brake pedal 32, a rotation speed detector 14 that detects a rotation speed Ni of the input shaft of the torque converter 2, and a rotation speed detector 15 that detects a rotation speed Nt of the output shaft of the torque converter 2. Also, there are connected to the controller 10 a vehicle speed detector 16 that detects the rotation speed of the output shaft of the transmission 3, that is, the speed of the vehicle, a traveling mode selection switch 7 that selects a traveling mode, a shift switch 8 that instructs a maximum speed to be selected among the 1st to 4th speeds, and a forward/reverse change-over switch 9 that instructs the forward/reverse movement of the vehicle. Operation amount detectors 12, 13 each may be constituted by, for instance, a stroke sensor that detects pedal strokes or a pressure sensor that detects a pedal operation pressure.

Figure 6:
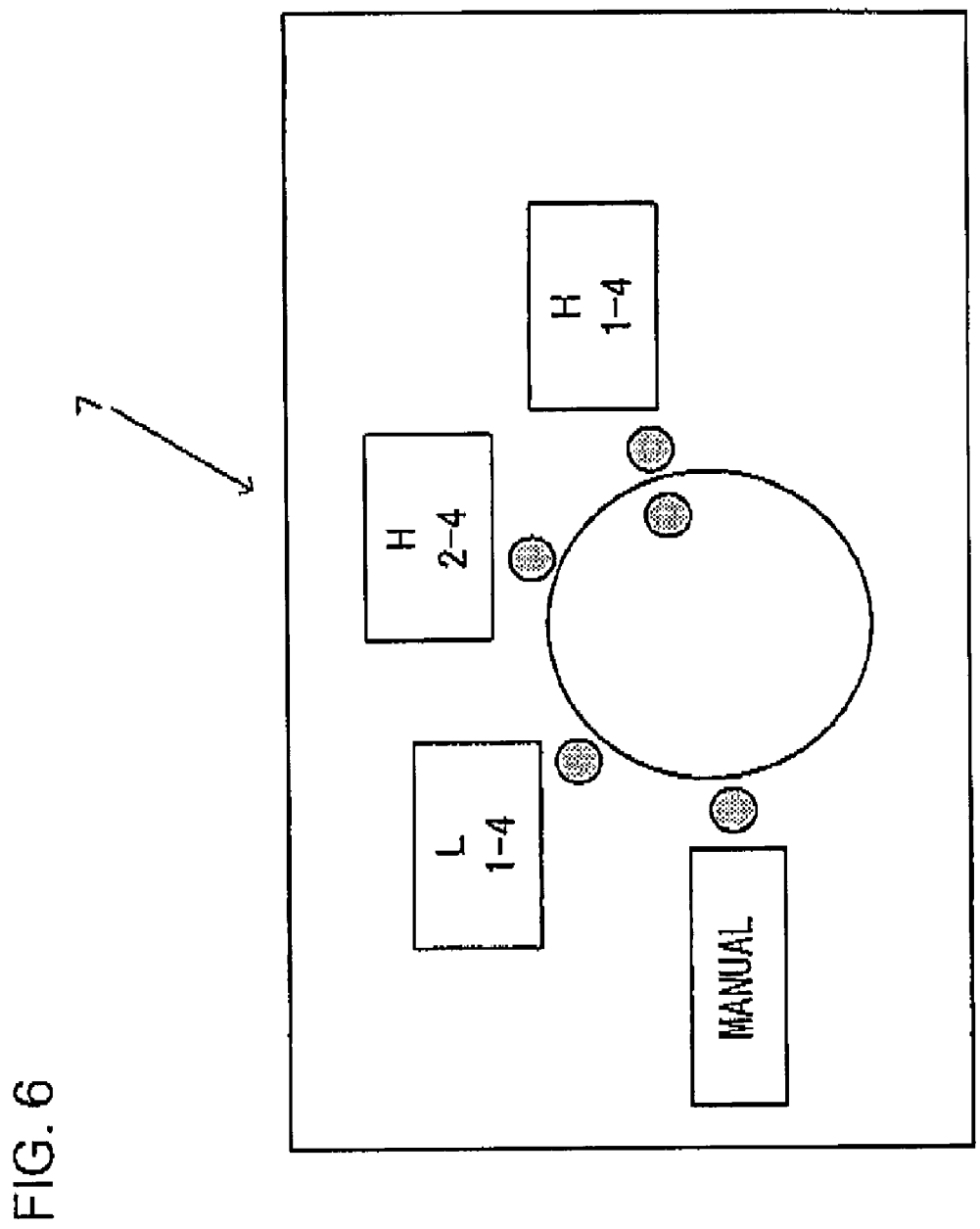
FIG. 6 is a diagram showing an example of a traveling mode selection switch according to the first embodiment.

FIG. 6 shows an example of the traveling mode selection switch 7. The traveling mode selection switch 7 is a switch of the dial type that can be switched to a manual mode, an L1-4 mode, an H2-4 mode, or an H1-4 mode. The switch 7 is disposed in the operator's cab, and operated by the driver. The speed stages of the transmission 3 can be changed manually by operating a gearshift lever not shown in the drawing within the range of 1st speed to 4th speed in a state where the manual mode is selected with the traveling mode selection switch 7.

The L1-4 mode and the H1-4 mode are driving modes each of which is capable of automatic gearshift in the range of 1st speed to 4th speed, and the H2-4 mode is a driving mode which is capable of automatic gearshift in the range of 2nd speed to 4th speed. In the following, the L1-4 mode is called an L-mode. The H1-4 mode and the H2-4 mode are called H-modes, respectively. In the L-mode and H-modes, the upshift condition is established when the torque converter speed ratio "e" reaches the predetermined value "eu". On this occasion, the upshift is permitted, if the vehicle speed "v" is equal to or higher than a predetermined lowest vehicle speed, whereas the upshift is prohibited if the vehicle speed "v" is lower than the lowest vehicle speed to be detailed later.

Assume that the lowest vehicle speeds at which upshifts of 1st speed→2nd speed, 2nd speed→3rd speed, and 3rd speed→4th speed occur in the L-mode are vL1, vL2, and vL3, respectively and that the lowest speeds at which upshifts of 1st speed→2nd speed, 2nd speed→3rd speed, and 3rd speed→4th speed occur in the H-mode are vH1, vH2, and vH3, respectively. Then, the lowest vehicle speeds have relationships: vL1<vL2<vL3 and vH1<vH2<vH3. Moreover, comparing the lowest vehicle speeds between the L-mode and H-modes, there are found relationships vL1<vH1, vL2<vH2, and vL3<vH3.

The controller 10 controls the engine speed according to the signal from the accelerator operation amount detector 12. Moreover, the controller 10 controls the solenoid valve for forward/reverse change-over according to the signal from the forward/reverse change-over switch 9. That is, when the forward/reverse change-over switch 9 is operated so as to be switched from the neutral position into the forward position or the reverse position, the solenoid valve for the forward/reverse change-over is switched to the forward position or the reverse position. As a result, the engine rotation power output is transmitted to the wheels 113,123, and the forward or reverse traveling of the vehicle becomes possible. In addition, the controller 10 controls the speed stages of the transmission 3 as follows.

Figure 7:
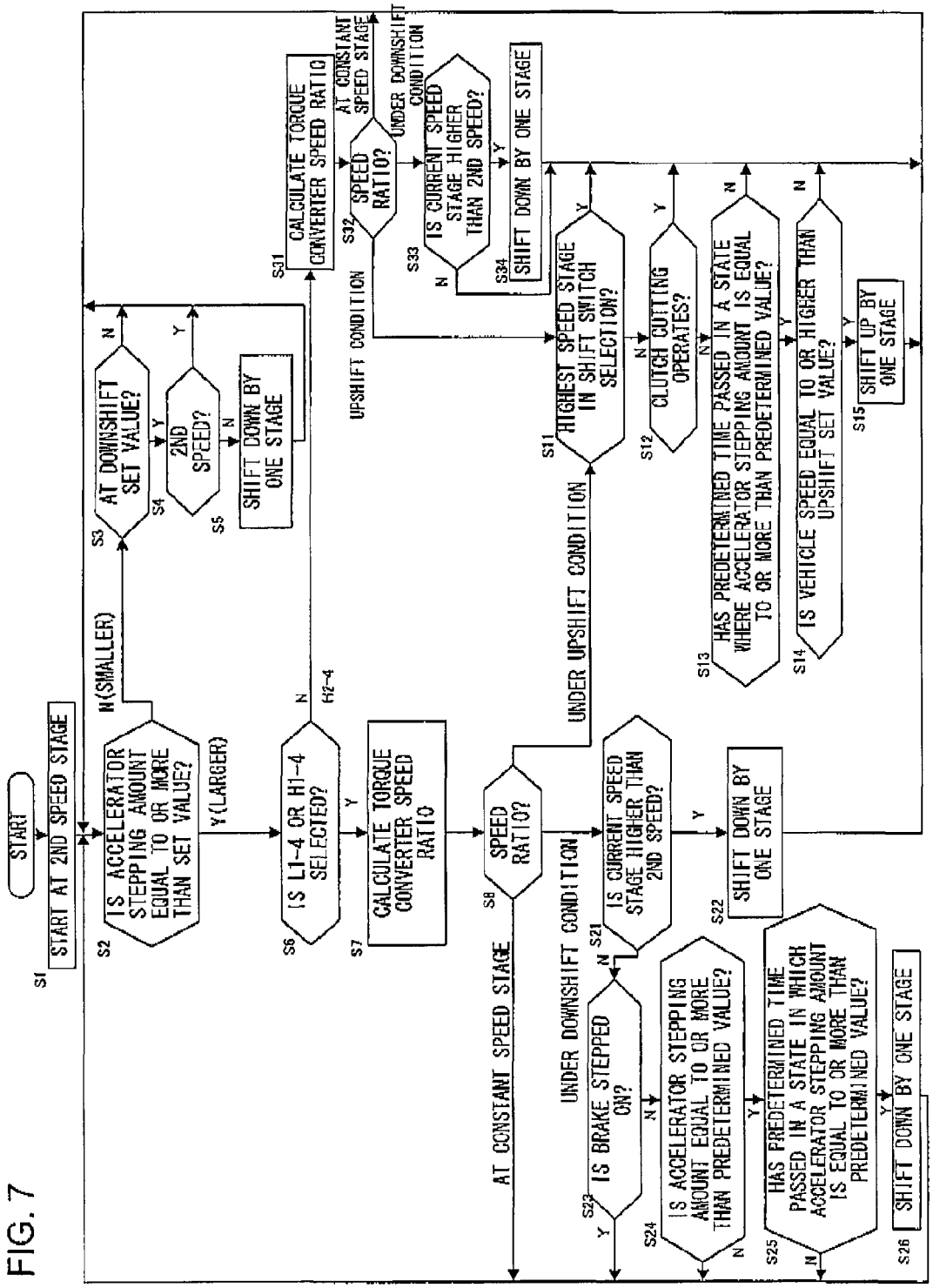
FIG. 7 is a flowchart for illustrating an example of gearshift processing in a controller according to the first embodiment.

FIG. 7 is a flow chart that illustrates an example of speed change control processing in the controller 10 according to the first embodiment, and shows an example of processing executed by a program implemented in the controller 10. This program starts when the forward/reverse change-over switch 9 is operated from the neutral position to the forward position or the reverse position and the traveling mode selection switch 7 is operated to be set to a mode other than the manual mode. In step S1, the 2nd speed instruction is output to the solenoid control unit 11, and the speed stage of the transmission 3 is controlled to be set to the 2nd speed.

In step S2, it is determined whether the accelerator pedal 31 has been stepped on to a predetermined value A1 determined beforehand or more. This is a determination of the presence of a deceleration operation by a return of the accelerator pedal. The predetermined value A1 is set to, for instance, about 30% of a maximum stepping amount of the accelerator pedal. The process proceeds to step S3 when NO is decided in step S2. In step S3, it is determined whether the vehicle speed "v" is equal to or lower than a predetermined vehicle speed "v1" provided beforehand. The set vehicle speed "v1" is a vehicle speed that permits shifting down, and is set for each speed stage. For instance, assuming that the vehicle speed that permits a downshift of 4th speed→3rd speed is v14, and the vehicle speed that permits a downshift of 3rd speed-2nd speed is v13, v13 and v14 are set: v14>v13.

Moreover, the vehicle speed "v1" is set to a value that is bigger than the vehicle speed (estimated value) when shifting down is performed by the torque converter speed ratio-based control. That is, the vehicle speed "v1" is set such that a downshift occurs before the torque converter speed ratio "e" becomes equal to or less than the predetermined value "ed", i.e., a reference value based on which downshift occurs by the torque converter speed ratio-based control. However, the shock of the vehicle increases when shifting down occurs too much early, and hence the vehicle speed "v1" is set to an optimal value in consideration of this point. The process proceeds to step S4 when YES is decided in step S3 and to returns to step S2 when NO is decided in step S3.

In step S4, it is determined whether the current speed stage is the 2nd speed. If the current speed stage is 3rd speed or 4th speed, the downshift signal is output to the solenoid control unit 11 to lower the speed stage by one stage in step S5. In other words, downshifts in this case are achieved based not on the torque converter speed ratio but on the vehicle speed. When the current speed stage is the 2nd speed, no downshift signal is output, and the state of the 2nd speed is maintained since YES is decided in step S4 is. The above-mentioned processing in step S2 to step S5 is repeated until it is determined that the depression amount A of the accelerator pedal 31 is the value A1 or more.

As a result, the vehicle shifts down to the 2nd speed when the accelerator pedal 31 is operated to be released while the vehicle is traveling at the 3rd speed, so that the operation amount A of the accelerator becomes smaller than the predetermined value A1, and the vehicle speed "v" is decreased to the set vehicle speed "v1" or lower. The vehicle shifts down to the 3rd speed while it is traveling at the 4th speed. As a result, the deceleration force that acts on the vehicle can increase to decelerate the vehicle promptly.

That is, the kinetic energy of the vehicle is consumed by the tires 113, 123, the torque converter 2, and the engine 1 rotated by the inertial force, for instance, when the deceleration operation is performed by lifting the foot off the accelerator pedal, and the vehicle decelerates. On this occasion, the vehicle speed upon shifting down is faster than that upon automatic shifting down according to the torque converter speed ratio-based control since a downshift occurs if the vehicle speed "v" decreases to the set vehicle speed "v1" or lower. As a result, the kinetic energy consumed in the torque converter 2 increases, and the vehicle can be quickly decelerated.

On the contrary, when it is configured such that a downshift occurs according to the torque converter speed ratio-based control at the time of deceleration operation by lifting the foot off the accelerator pedal, the timing of the downshift is delayed and the energy consumed in the torque converter decreases, so that a big deceleration force can not be obtained. Therefore, there arises a problem that the mileage upon deceleration is prolonged and the operation of the brake pedal 32 is needed separately in order to decelerate the vehicle quickly. This makes the driving operation complex and decreases the lifetime of the brake.

In this respect, the speed change control system according to one embodiment of the present invention can prevent the shock upon shifting down of 2nd speed→1st speed. This is because when the vehicle starts traveling after selecting an automatic gearshift (or speed change) mode other than the manual mode and performing the operation of the forward/reverse change-over, the speed stage is shifted down to the 2nd speed (step S1) but not to the 1st speed (step S4, step S5). Moreover, when the vehicle is accelerated again by stepping on the accelerator 31 after the downshift, there will be no upshift of the 1st speed→2nd speed since the vehicle is started at the 2nd speed. Accordingly, the shock due to the upshift can be reduced and smooth acceleration can be obtained. The speed stage to be set by shifting down is limited to the 2nd speed. However, it may be configured such that the downshift is possible down to the 1st speed or the limit value of the speed stage to be set by the downshift may be made variable.

The process proceeds to step S6 when it has been determined that the accelerator depression amount A is equal to or more than the predetermined value A1 in step S2. In step S6, it is determined which one of the driving modes has been selected according to the signal from the traveling mode selection switch 7. The process proceeds to step S7 when it has been determined that either one of the L1-4 mode or the H1-4 mode is selected, that is, when it has been determined that a driving mode whose lowest speed stage is the 1st speed is selected.

In step S7, the ratio of the rotation speed Ni of the input shaft of the torque converter 2 and the rotation speed Nt of the output shaft of the torque converter 2, that is, the torque converter speed ratio "e" (=Nt/Ni) is calculated according to the signals from the rotation speed detectors 14,15, respectively. In step S8, the value of the torque converter speed ratio "e" is determined.

The process returns to step S2 when the torque converter speed ratio "e" is larger than the predetermined value "ed", which is a downshift determination threshold and smaller than the predetermined value "eu", which is an upshift determination threshold (ed<e<eu). In this case, no control signal for gearshifting is output to the solenoid control unit 11 since none of the upshift condition and the downshift condition is established, and the current speed stage is maintained.

The process proceeds to step S11 when it has been determined that the torque converter speed ratio "e" is equal to or more than the predetermined value "eu" in step S8 (e≧eu), that is, when it is determined that the upshift condition in the torque converter speed ratio speed change control is established. In step S11, it is determined whether the current speed stage is a maximum speed stage set with the shift switch 8. The process returns to step S2 when YES is decided in step S11. On this occasion, the transmission 3 is not shifted up, and the current speed stage is maintained. The process proceeds to step S12 when NO is decided in step S11.

In step S12, it is determined whether a clutch cutting mechanism operates. The clutch cutting mechanism is a mechanism that sets clutch pressures of a forward side clutch and a reverse side clutch to zero (0) to render the forward/reverse side clutches off (released) in association with the brake pedal 32 when the brake pedal is stepped on to a predetermined extent or more. The speed change control system of this embodiment includes this clutch cutting mechanism and the CPU in the controller 10 detects that the clutch cutting mechanism is ON when the signal from the brake operation amount detector 13 indicates that the stepping on of the brake pedal 32 is to the predetermined extent or more. The clutch cutting mechanism turns inactivated when the stepping on of the brake pedal 32 is stopped and the clutch is turned ON (connected).

The process returns to step S2 when YES is decided in step S12. In this case, no upshift occurs even if the upshift condition has been established, and the current speed stage is maintained. That is, if the clutch cutting mechanism operates by stepping on of the brake pedal 32, the traveling load of the torque converter 2 decreases and the torque converter speed ratio "e" becomes equal to or more than the predetermined value "eu". However, the transmission 3 is not shifted up and the current speed stage is maintained. As a result, if the stepping on of the brake pedal 32 is stopped to inactivate the clutch cutting mechanism, an enough traveling driving force can be obtained when the clutch is connected to a drive, so that the traveling of the vehicle can be started smoothly.

On the contrary, if the upshift is permitted when the clutch cutting mechanism is active, smooth traveling of the vehicle becomes difficult. That is, if, for instance, the vehicle is once stopped upon hill-climbing to activate the clutch cutting mechanism and then the vehicle restarted after an upshift to inactivate the clutch cutting mechanism, it is sometimes the case that the traveling driving force is insufficient for the vehicle to perform hill-climbing traveling since the speed stage is high. In this case, a downshift occurs while the vehicle is sliding down on the slope to increase the traveling driving force to enable hill-climbing traveling. Therefore, the traveling operation of the vehicle is unstable.

The process proceeds to step S13 when NO is decided in step S12. In step S13, it is determined whether the accelerator pedal 31 is stepped on to a predetermined value A2 or more and whether this state is continued for a predetermined time t1 (for instance, 1 to 2 seconds). The predetermined value A2 is set to, for instance, a value equivalent to the above-mentioned predetermined value A1 (step S2) (about 30% of total operation amount). The predetermined value A2 may be set to a value larger than the predetermined value A1.

The process returns to step S2 when NO is decided in step S13. In this case, no upshift is performed even if the upshift condition is established in step S8 or step S32, and the current speed stage is maintained. As a result, if the accelerator pedal 31 is stepped on in such a manner that the accelerator stepping amount A is equal to or smaller than the predetermined value A2, that is, if the traveling load on the vehicle is light and the vehicle is traveling in a state in which the upshift condition of e>eu is established, then the traveling load immediately increases to establish e<eu upon pressing down of the accelerator pedal 31 to the predetermined value A2 or more. Therefore, the upshift condition is brought in failure before the predetermined time t1 passes, and the upshift of the transmission 3 is obstructed. As a result, the vehicle is accelerated at the low speed stage, so that an enough traveling acceleration can be obtained.

The process proceeds to step 14 when YES is decided in step S13. In step S14, it is determined whether the vehicle speed "v" detected by the vehicle speed detector 16 is equal to or more than a predetermined lowest vehicle speed. Here, the lowest vehicle speed is provided for each driving mode and each speed stage as mentioned above, and the lowest vehicle speed corresponding to each driving mode and each speed stage is compared with the vehicle speed "v". For instance, vL2 is compared with the vehicle speed "v", when the L1-4 mode is selected with the mode selection switch 7 and the current speed stage is the 2nd speed whereas vH2 is compared with the vehicle speed "v" when the H1-4 mode is selected with the mode selection switch 7 and the current speed stage is the 2nd speed. When the vehicle speed is vL2 or more in the L1-4 mode or the vehicle speed is vH2 or more in the H1-4 mode, YES is decided in step S19 and the process proceeds to step S15. The process returns to step S2 when NO is decided in step S14.

In step S15, an upshift signal is output to the solenoid control unit 11. As a result, the transmission 3 shifts up by one stage, i.e., 1st speed→2nd speed, 2nd speed→3rd speed, or 3rd speed→4th speed. As mentioned above, the vehicle maintained at the low speed stage can travel at a low speed by configuring the transmission not to shift up until the vehicle speed "v" is equal to or more than the lowest vehicle speed even if the torque converter speed ratio "e" is large (load is light). As a result, when the vehicle is set in, for instance, the 2nd speed and earth and sand in the bucket etc. are to be loaded onto the truck, the vehicle can approach the truck by traveling at a low speed with the speed stage being maintained at the 2nd speed even if the load is light, so that the working efficiency is improved.

The lowest vehicle speeds that permit shifting up are different between the L-mode and H-mode as described in step S14. When the lowest vehicle speeds of the L-mode at 1st speed to 3rd speed are assumed to be vL1 to vL3, respectively, and the lowest vehicle speeds of H-modes at 1st speed to 3rd speed are assumed to be vH1 to vH3, respectively, then vL1<vH1, vL2<vH2, and vL3<vH3 are obtained. The L-mode enables upshifts in lower speeds than H-modes when comparing them at the same speed stage. Therefore, when the L-mode is selected, the fuel consumption is in smaller amounts and fuel cost is improved. At the same time, the engine noise falls, too. Accordingly, the work environment can be improved. Moreover, when the H-modes are selected, a work (for instance, loading work to the truck) at low speed can be done easily without operating the brake pedal 32 since no upshift occurs until the vehicle speed "v" becomes higher compared to that set in L-mode.

The process proceeds to step S21 when it has been determined in step S8 that the torque converter speed ratio "e" is equal to or less than the predetermined value "ed" (e≦ed), which is a downshift determination threshold, that is, when it has been determined that the downshift condition is established. In step S21, it is determined whether the current speed stage is higher than the 2nd speed. When the current speed stage is the 3rd speed or the 4th speed, YES is decided in step S21, and the process proceeds to step S22. The process proceeds to step S23 when NO is decided in step S21. In step S22, a downshift signal is output to the solenoid control unit 11. As a result, the transmission 3 is shifted down by one stage in the fashion of 4th speed to 3rd speed or 3rd speed to 2nd speed.

In step S23, it is determined whether the brake pedal 32 has been stepped on, that is, whether a braking device has operated in response to the signal from the brake operation amount detector 13. The operation of the braking device may be detected based on a physical amount other than the operation amount in which the brake pedal 32 is stepped on. The process returns to step S2 when YES is decided in step S23. On this occasion, the downshift to the 1st speed is not performed even if the downshift condition is established, and the state of the 2nd speed is maintained. That is, if the brake pedal 32 is stepped on at the 2nd speed traveling, the traveling load rises and the torque converter speed ratio "e" becomes equal to or less than the predetermined value "ed". However, the transmission 3 does not shift down and the 2nd speed traveling is maintained.

As a result, if the vehicle approaches a truck at the 2nd speed in order to achieve, for instance, a work of loading on the truck and the vehicle is stopped in front of the truck by operating the brake pedal 32, then it is only necessary to provide a braking force enough to resist the driving force to enable the vehicle to travel at the 2nd speed since the speed stage is not shifted down to 1st speed. Therefore, the necessary braking force is small as compared with the case where the vehicle traveling at the 1st speed is to be braked, so that the lifetime of the brake can be extended, and at the same time the vehicle can surely be braked.

The process proceeds to step S24 when NO is decided in step S23. In step S24, it is determined whether the operation amount A of stepping on the accelerator is equal to or more than a predetermined value A3. The predetermined value A3 is set to, for instance, a value equal to the above-mentioned predetermined value A1 (for instance, about 30% of total operation amount) (step S2). The predetermined value A3 may be set to a value that is larger than the predetermined value A1. The process returns to step S2 when NO is decided in step S24. Thus, when the accelerator stepping amount is less than the predetermined value even if the downshift condition is established, the downshift to the 1st speed is not performed, and the state of the 2nd speed is maintained. That is, the downshift of 2nd speed→1st speed is prohibited when the accelerator stepping amount A is smaller than the predetermined value A3 since it is considered that the driver is not demanding a big driving force. As a result, the number of times of gearshifts of 2nd speed→1st speed and 1st speed→2nd speed decreases, so that the gearshift shock can be reduced and the lifetime of the clutch can be extended.

The process proceeds to step S25 when YES is decided in step S24. In step S25, the accelerator pedal 31 is stepped on to such an extent that is equal to or more than the predetermined value A3, and it is determined whether this state is continued for a predetermined time t2 (for instance, for about 1 second). The process returns to step S2 when NO is decided in step S25. On this occasion, the downshift to the 1st speed is not performed even if the downshift condition is established, and the state of the 2nd speed is maintained.

When the amount of the accelerator stepping is equal to or more than the predetermined value A3 at the time of starting the vehicle, the traveling load rises sharply and the torque converter speed ratio "e" is equal to or less than the predetermined value "ed", which is a downshift determination threshold. However, the downshift to the 1st speed does not occur if the load decreases thereafter before the predetermined time t2 passes to establish e>ed. Therefore, it becomes difficult to perform a downshift to the 1st speed at the time of starting the vehicle. On the other hand, if it is configured such that the downshift to the 1st speed is permitted as soon as the amount of stepping on the accelerator becomes equal to or more than the predetermined value A3, then the frequency of gearshifts of 2nd speed→1st speed and 1st speed→2nd speed increases. This not only causes gearshift shock but also adversely affects the lifetime of clutch. Moreover, the ride quality of the vehicle is deteriorated since the shock upon the gearshift is large, too.

The process proceeds to step S26 when YES is decided in step S25. In step S26, a downshift signal is output to the solenoid control unit 11. As a result, the transmission 3 shifts clown by one stage as 2nd speed→1st speed. As mentioned above, it is configured such that the downshift to the 1st speed is prohibited unless the state where the amount of the accelerator stepping is equal to or more than the predetermined value A3 is continued for the predetermined time t2 or more even if the torque converter speed ratio "e" is small (even if the load is large). Therefore, there occurs no downshift to the 1st speed except when a large traveling driving force is needed, so that the number of times in which the downshift to the 1st speed occurs can be minimized. As a result, the gearshift shock is decreased, the clutch lifetime is prolonged, and fuel cost is improved since the frequency of traveling at the 1st speed is reduced, too.

On the other hand, the process proceeds to step S31 when it is determined that the H2-4 mode is selected in step S6, that is, when the driving mode whose lowest speed stage is the 2nd speed is selected. In step S31, the torque converter speed ratio "e" is calculated according to the signals from the rotation speed detectors 14, 15. In step S32, the value of the torque converter speed ratio "e" is determined.

The process returns to step S2 when it is determined in step S32 that the torque converter speed ratio "e" is larger than the predetermined value "ed", which is a downshift determination threshold, and smaller than the predetermined value "eu", which is an upshift determination threshold (ed<e<eu). On this occasion, no control signal for speed change is output to the solenoid control unit 11 since none of the upshift condition and the downshift condition is established, so that the current speed stage is maintained.

The process proceeds to step S11 when it is determined in step S32 that the torque converter speed ratio "e" is equal to or more than the predetermined value "eu" (e≧eu), in other words, when it is determined that the upshift condition is established, and subsequently, similar processing to the above is executed in step S11 to step S15. That is, the upshift processing is performed regardless of the traveling mode in the present embodiment.

The process proceeds to step S33 when it is determined in step S32 that the torque converter speed ratio "e" is equal to or less than the predetermined value "ed" (e≦ed), that is, when it is determined that the downshift condition has been established. In step S33, it is determined whether the current speed stage is higher than the 2nd speed. The process proceeds to step S34 when the current speed stage is the 3rd speed or the 4th speed and YES is decided in step S33. Step S34 is skipped when NO is decided in step S33, and the process returns to step S2. In step S34, a downshift signal is output to the solenoid control unit 11. As a result, the transmission 3 is shifted down by one stage: the 4th speed→the 3rd speed, or the 3rd speed→the 2nd speed. The lowest speed stage is limited to the 2nd speed since the H2-4 mode has been selected, so that there occurs no downshift of the 2nd speed→the 1st speed.

Next, the main operations of the speed change control system according to this embodiment are described.

After an engine ignition switch is turned ON, the forward/reverse change-over switch 9 is set to the forward position, and the accelerator pedal 31 is stepped on, the engine speed rises, the rotation of the engine power output shaft is transmitted to the transmission 3 through the torque converter 2, and the vehicle starts traveling. The shock of the vehicle at the time when the vehicle starts traveling is small so that the vehicle can start traveling smoothly since it is at the 2nd speed (step S1). Since the vehicle is started at the 2nd speed, a rise in rotation speed of the engine is suppressed, so that fuel cost can be improved and the noise can be reduced.

The upshift condition is established when the vehicle is traveling at the amount of stepping on the accelerator equal to or more than the predetermined value A1 and if the traveling load of the vehicle becomes small such that the torque converter speed ratio "e" becomes equal to or more than the predetermined value "eu". On this occasion, the transmission 3 shifts up: the 2nd speed→the 3rd speed when the 3rd or higher speed is selected as the maximum speed stage by the shift switch 8, the clutch cutting mechanism is inactive, the state where the amount of stepping on the accelerator is equal to or more than the predetermined value A2 is continued for the predetermined time t1, and the vehicle speed "v" is equal to or higher than the lowest vehicle speed vL2 or vH2 (step S11 to step S15).

Figure 8:
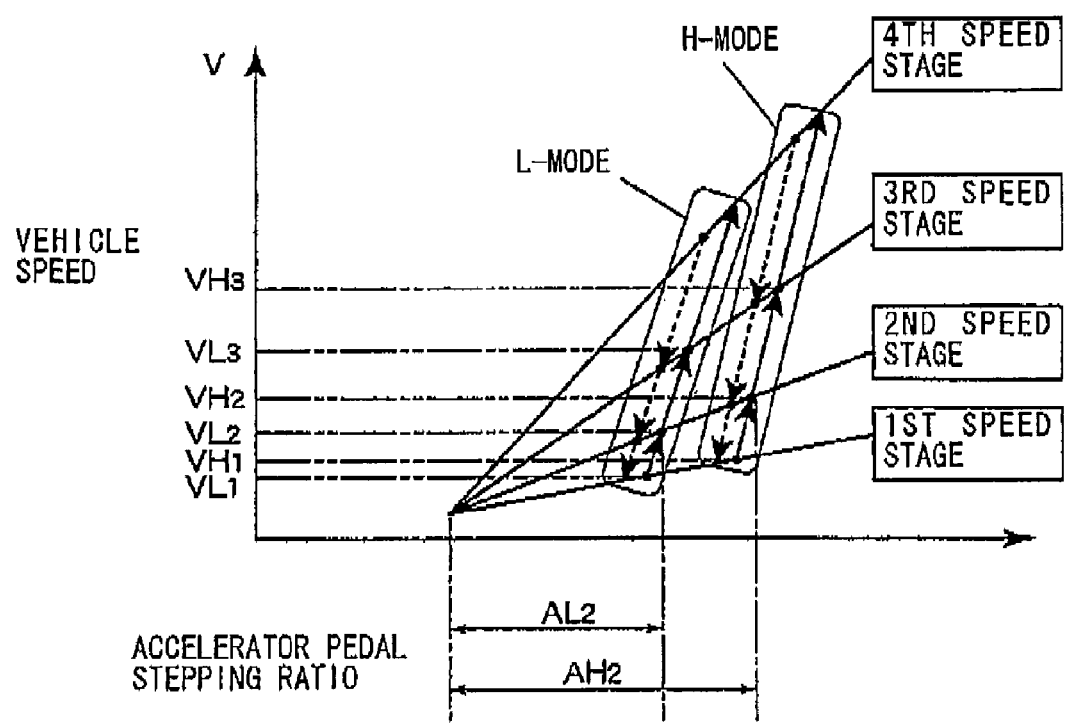
FIG. 8 is a diagram showing an example of operational characteristics of the speed change control system according to the first embodiment.

FIG. 8 is a diagram showing an example of operation of the speed change control system according to the first embodiment. The relationship between the lowest vehicle speed vH2 in the H-mode and the lowest vehicle speed vL2 in the L-mode is vH2>vL2, and if the H-mode (H1-4 mode or H2-4 mode) is selected with the mode selection switch 7, the state of the 2nd speed can be maintained until the rate of stepping on the accelerator reaches AH2 (for instance, 75%). As a result, a complex operation of the brake pedal 32 becomes unnecessary, for instance, when the loading work to the truck is to be performed, since the rise of the vehicle speed due to the upshift can be suppressed, and this kind of work can be done easily. In the H-mode, the vehicle speed "v" becomes equal to or higher than the lowest vehicle speed vH2 and the upshift of 2nd speed→3rd speed occurs, as the accelerator pedal 31 is stepped on, for instance, such that the stepping rate becomes equal to or more than AH2.

On the other hand, it is preferred that the L-mode is selected for a type of work in which the vehicle is to travel most of time. In the state where the L-mode (L1-4 mode) is selected with the mode selection switch 7, the vehicle speed "v" becomes equal to or higher than the lowest vehicle speed vL2, and the upshift of the 2nd speed→the 3rd speed occurs when the rate of stepping on the accelerator reaches AL2 (for instance, 50%). As a result, shifts up can occur by fewer stepping on the accelerator in the L-mode than in the H-mode, so that fuel cost is improved and the noise can be reduced in the L-mode. Moreover, the upshift is permitted at once when the torque converter speed ratio "e" becomes equal to or higher than the predetermined value "eu" in the L-mode since the lowest vehicle speed is vL2<vH2, and the vehicle can travel within the range in which the torque converter efficiency is comparatively high as compared with the H-mode. The work can be performed in the state of the 2nd speed even in the L-mode if the maximum speed stage is set to the 2nd speed with the shift switch 8.

The engine speed decreases to decelerate the vehicle if the accelerator pedal 31 is operated to be returned while the vehicle is traveling at the 3rd speed or the 9th speed. On this occasion, if the amount of stepping on the accelerator is smaller than that of the predetermined value A1, and if the vehicle speed "v" is equal to or lower than the set vehicle speed "v1", there can occur shifts down of the 4th speed→the 3rd speed, and further the 3rd speed→the 2nd speed. Therefore, the deceleration energy of the vehicle increases, and the vehicle can be decelerated promptly. Moreover, when the vehicle is accelerated again after the vehicle has once been decelerated, the vehicle can start traveling at the 2nd speed but not at the 3rd speed or the 4th speed, so that smooth acceleration can be obtained. Since the lowest speed stage is limited to the 2nd speed when the amount of stepping on the accelerator is smaller than the predetermined value A, the shock is small, and the ride quality of the vehicle is also good.

After the vehicle is stopped, the forward/reverse change-over switch 9 is operated to set once in the neutral position, and then the forward/reverse change-over switch 9 is operated to set in the forward position again in order to drive the vehicle. In this case, too, the transmission is set to the 2nd speed (step S1). As a result, the shock upon starting is small since the vehicle starts at the 2nd speed. In this case, if the forward/reverse change-over switch 9 is operated to be set in the forward position or the reverse position, the vehicle is brought into a startable state in which the vehicle is ready to start traveling. Therefore, always the transmission 3 is set to the second speed regardless of the speed stage having been set when the forward/reverse change-over switch 9 was operated to be set in the neutral position.

Whether the vehicle is in a startable state may be determined not only when the forward/reverse change-over switch 9 is operated to be set in the forward position or the reverse position but also when the engine ignition switch is turned ON. It may be configured such that the vehicle is determined to be in a startable state when the vehicle speed "v" becomes equal to or lower than the predetermined value (for instance, when it has stopped). Then, the transmission 3 is controlled to be set to the 2nd speed.

For instance, for performing a work to take earth and sand into the bucket by thrusting it into piled earth and sand or mound, the mode (L1-4 mode or H1-4 mode) that allows downshifts to the 1st speed is to be selected with the mode selection switch 7. When the vehicle is made to advance to the mound, traveling at the 2nd speed under such a condition, the traveling load increases to cause the torque converter speed ratio "e" to become equal to or less than the predetermined value "ed", so that the downshift condition is established. At this time, if the brake pedal 32 is not operated and a state where the amount of stepping on the accelerator is equal to or more than the predetermined value A3 is continued for the predetermined time t2, there occurs a downshift to the 1st speed (step S23 to step S26).

As a result, the driving force of the vehicle increases, so that the driver can easily perform heavy duty works such as excavation without downshift operations. Even when the traveling load increases upon hill-climbing traveling, a smooth traveling is possible since the transmission 3 shifts down to the 1st speed. A downshift at the best timing is possible since the downshift from the 2nd speed to the 1st speed occurs according to the torque converter speed ratio "e". Therefore, the vehicle can be caused to travel in the region where the torque converter efficiency is high as compared with the case where the driver shifts down the transmission manually, so that the fuel consumption can be suppressed.

When a big driving force is unnecessary while the vehicle is traveling, the H2-4 mode is to be selected, for instance, with the mode selection switch 7. Under such a condition, the transmission shifts down only to the 2nd speed even if the downshift condition is established, and the downshift of 2nd speed→1st speed is obstructed (step S33, step S34). Therefore, the number of times of the shift changes decreases, so that the gearshift shock can be reduced, and the lifetime of clutches for 1st speed and 2nd speed can be prolonged.

The following operational advantages can be achieved in the first embodiment described above.

(1) A gearshift occurs by the torque converter speed ratio-based control when the accelerator pedal is stepped on to an amount equal to or more than the predetermined value A1. On this occasion, no upshift occurs until the vehicle speed "v" becomes equal to or higher than the lowest vehicle speed even if there is established the upshift condition that the torque converter speed ratio "e" is equal to or larger than the predetermined value "eu" (step S14, step S15). As a result, the timing of the upshift can be delayed, so that the work can be done while the vehicle is traveling at low speed without operating the brake pedal 32.

(2) The L-mode and H-mode can be selected with the mode selection switch 7, and the lowest vehicle speed in the L-mode is set to be lower than the lowest vehicle speed in the H-mode in the same speed stage. As a result, when the L-mode is selected, the improvement of fuel cost and the reduction of the engine noise can be achieved since an upshift occurs without stepping on the accelerator pedal 31 too much. Moreover, when the H-mode is selected, for instance, a work for loading loads onto the truck can be easily done since traveling at the speed stage lower than that when the L-mode is selected can be maintained.

(3) Works at the low speed stage become possible even in the L-mode, and the vehicle can be adapted to various working modes since the maximum speed stage of the transmission 3 is limited with the shift switch 8 in the torque converter speed ratio-based control (step S11).

(4) In the torque converter speed ratio-based control, the upshift is prohibited when the brake pedal is stepped on to an extent equal to or more than the predetermined value to activate the clutch cutting mechanism even if the torque converter speed ratio "e" is equal to or more than the predetermined value "eu" (step S12). Therefore the clutch comes to be reconnected at the lower speed stage, and the vehicle can start traveling smoothly. Moreover, the upshift is prohibited until the predetermined time t1 passes from the time when the amount of stepping on the accelerator becomes equal to or more than the predetermined value A2 even if the torque converter speed ratio "e" is equal to or more than the predetermined value "eu" (step S13). Therefore, the vehicle can be accelerated at a low speed stage to exhibit good acceleration.

(5) One of the modes (L1-4 mode and H1-4 mode) whose lowest speed stage is the 1st speed and the mode (H2-4 mode) whose lowest speed stage is the 2nd speed can be selected with the selection switch 7. Therefore, the best mode corresponding to the contents of work can be set. That is, upon the heavy-load working, a big traveling driving force can be obtained by selecting the mode whose lowest speed stage is the 1st speed. On the other hand, upon light-load working, traveling with little gearshift shock is possible by the selection of the mode whose lowest speed stage is the 2nd speed.

(6) Even when there is established the downshift condition that the torque converter speed ratio "e" is equal to or less than the predetermined value "ed" while the vehicle is traveling, the downshift of 2nd speed→1st speed is prohibited if the brake pedal 32 is stepped on (step S23). Therefore, no big braking force is necessary when the vehicle is braked and the vehicle can be easily stopped by the braking device. Moreover, occasions in which the vehicle traveling at the 1st speed is slowed down to stop with the brake become fewer, and the lifetime of the brake device can be extended.

(7) The downshift of 2nd speed→1st speed is prohibited even if the torque converter speed ratio "e" becomes equal to or less than the predetermined value "ed" while the vehicle is traveling on the 2nd speed unless the amount of stepping on the accelerator is equal to or more than the predetermined value A3, that is, unless there is performed an operation of the accelerator that would require a big driving force (step S24). As a result, the number of times in which the downshift of 2nd speed→1st speed occurs is decreased, and the gearshift shock can be reduced.

(8) The downshift of 2nd speed→1st speed is prohibited even if the torque converter speed ratio "e" becomes equal to or less than the predetermined value "ed" while the vehicle is traveling on the 2nd speed unless the state where the amount of accelerator stepping is equal to or more than the predetermined value A3 is continued for the predetermined time t2 (step S25). As a result, there is established e>ed before the predetermined time t2 passes even if the traveling load sharply increases by stepping on the accelerator pedal 31 when the vehicle starts at the 2nd speed. Therefore, there occurs no downshift to the 1st speed, so that the gearshift shock can be reduced.

(9) Since shift down to the 1st speed automatically occur when the predetermined condition is established while the vehicle is traveling at the 2nd speed, there is no need to instruct the downshift manually with the downshift switch, so that complex operations are unnecessary.

(10) Since it is configured such that operation of the forward/reverse change-over switch 9 to be set to the forward position or the reverse position causes the transmission 3 to be set in the 2nd speed to permit the vehicle to start at the 2nd speed (step S1), the shock in the vehicle upon starting is small so that the vehicle can start traveling smoothly.

(11) The torque converter speed ratio-based control is adopted such that if the accelerator pedal 31 is operated in a stepping amount equal to or more than the predetermined value A1 after having set the transmission 3 at the 2nd speed, an automatic gearshift occurs in proportion to the torque converter speed ratio "e". Therefore, the vehicle can travel by switching the speed stage to an optimal stage after starting at the 2nd speed.

(12) The upshift and the downshift are permitted when the amount of stepping on the accelerator is equal to or more than the predetermined value A1 after the vehicle has started at the 2nd speed, whereas when the amount of stepping on the accelerator is less than the predetermined value A1, only the downshift is permitted. As a result, there occurs no upshift even if the torque converter speed ratio "e" becomes equal to or more than the predetermined value "eu" by the return operation of the accelerator pedal 31, so that the vehicle can be decelerated at an earlier stage.

(13) Downshift occurs when the amount of the accelerator stepping is equal to or less the predetermined value A1 and the vehicle speed is equal to or less than the predetermined value v1 (step S2 to step S5). That is, under the condition that the amount of the accelerator stepping is less than the predetermined value A1, downshifts occur not based on the torque converter speed ratio but based on the vehicle speed. As a result, the timing of the downshift can be advanced, so that the deceleration of the vehicle is increased and the vehicle speed can be reduced promptly even if the brake pedal 32 is not stepped on.

(14) Since shift down occurs only to the 2nd speed under the condition under which the amount of stepping on the accelerator is less than the predetermined value A1 (step S5), the gearshift shock can be reduced. Moreover, since the downshift of 2nd speed→1st speed is prohibited, there is no upshift of 1st speed→2nd speed, so that the number of times in which the shift changes occur is decreased, and the lifetime of clutches can be extended.

Second Embodiment

The speed change control system achieved in the second embodiment of the present invention is now explained in reference to FIGS. 9 to 12. Note that the following explanation mainly focuses on the differences from the first embodiment.

In the first embodiment, the L-mode and H-mode, which have different lowest vehicle speeds upon the upshift based on the torque converter speed ratio, are made selectable. However, either the torque converter speed ratio-based mode or the vehicle speed-based mode can be selected in the second embodiment. That is, in the second embodiment, the traveling mode selection switch 7 that selects either the automatic speed change based on the torque converter speed ratio or the automatic speed change based on the vehicle speed is disposed instead of the mode selection switch 7 that selects L or H mode.

Figure 9:
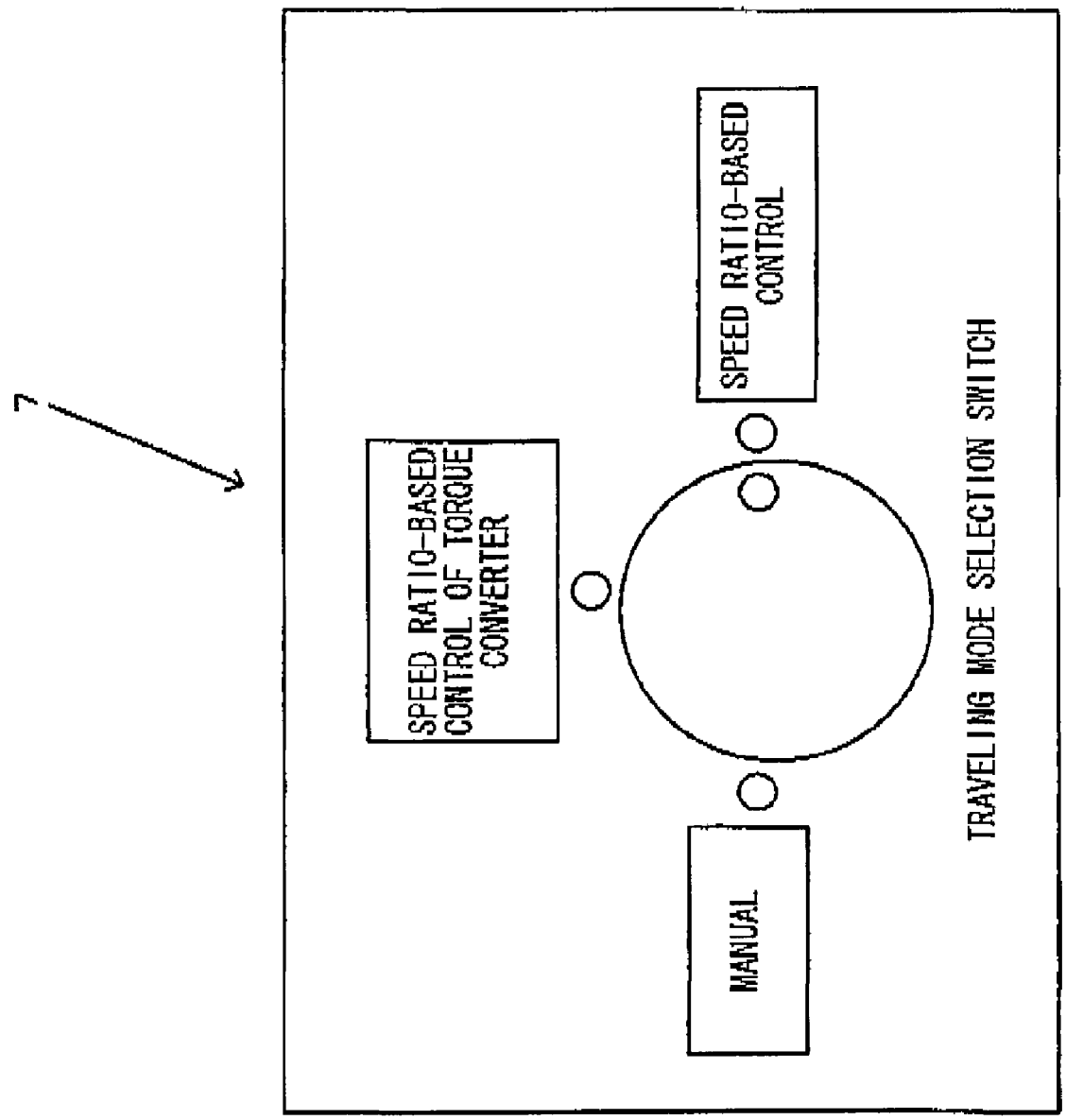
FIG. 9 is a diagram showing an example of the traveling mode selection switch according to the second embodiment.

FIG. 9 is a diagram showing an example of the traveling mode selection switch 7 according to the second embodiment. The traveling mode selection switch 7 is a switch of the dial type that can be changed over to a manual mode, the torque converter speed ratio-based mode, or the speed-based mode. In the second embodiment, when either the torque converter speed ratio-based mode or the speed ratio-based mode is selected, the gearshift is possible within the range of 1st speed to 4th speed.

Figure 10:
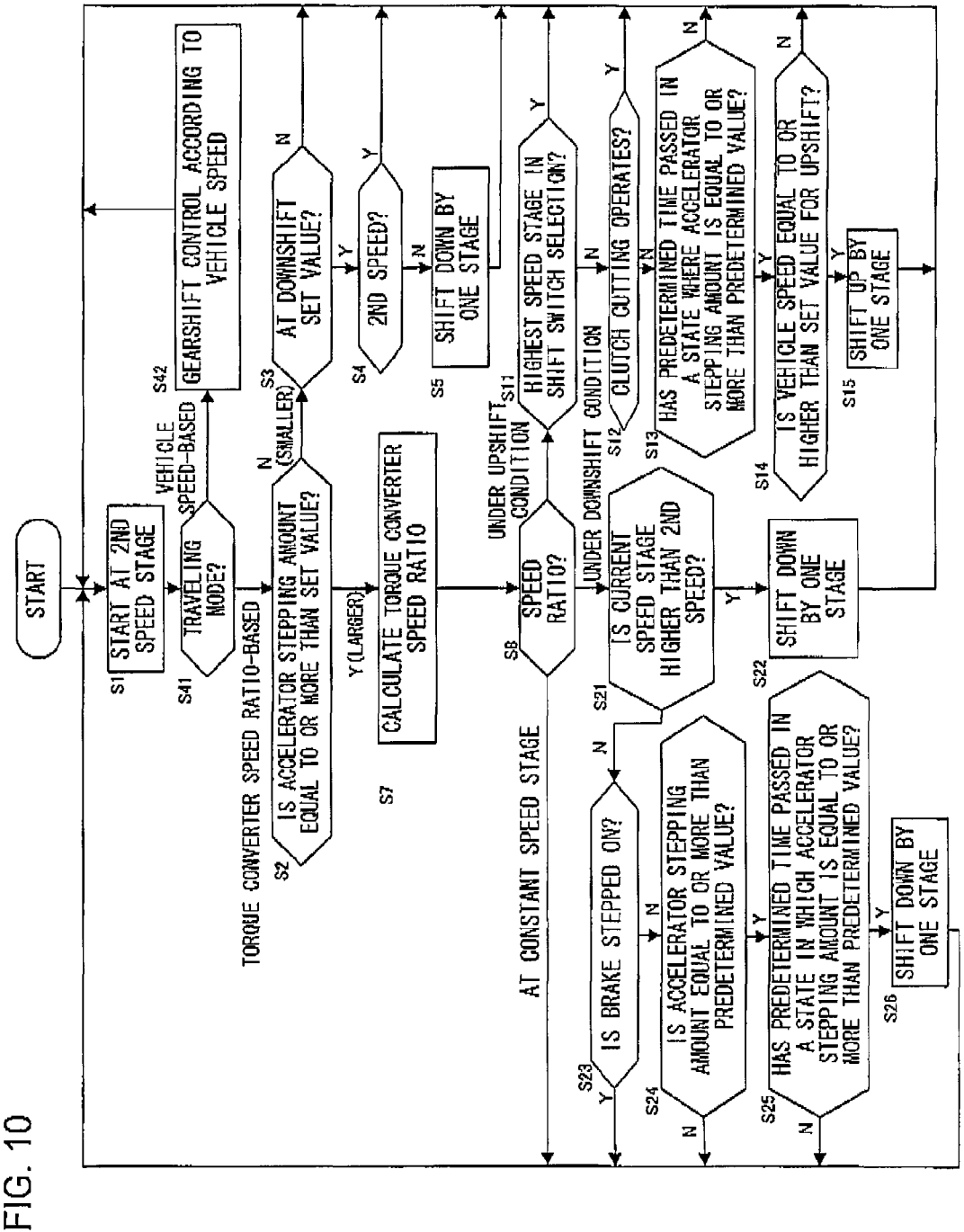
FIG. 10 is a flowchart illustrating an example of gearshift processing in the controller according to the second embodiment.

FIG. 10 is a flowchart for illustrating speed change control processing in the controller 10 according to the second embodiment. Note that the same step numbers are assigned to steps identical to those in FIG. 7 and the following explanation focuses on the differences from FIG. 7. In the second embodiment, the vehicle is at the 2nd speed when it starts (step S1).

In step S41, the driving mode is determined according to the signal from the traveling mode selection switch 7. The process proceeds to step S2 when it is determined that the torque converter speed ratio-based mode has been selected. Then, it is determined similarly to the above whether the amount of the accelerator stepping is equal to or more than the predetermined value A1. The process proceeds to step S7 when YES is decided in step S2 and the torque converter speed ratio is calculated. The subsequent processing is similar to that shown in FIG. 7. In this case, the lowest vehicle speed in step S14 is set, for instance, equal to one of the lowest vehicle speeds vL1 to vL3 in the L-mode in the first embodiment. A change-over switch that switches the range of gearshift may be separately provided to make it possible to change the speed within the range of 1st speed to 4th speed when the change-over switch is ON and within the range of 2nd speed to 4th speed when the change-over switch is OFF. In this manner, the processing in step S6 and the processing in step S31 to step S34 in FIG. 7 can be added to the process shown in FIG. 10.

Figure 11:
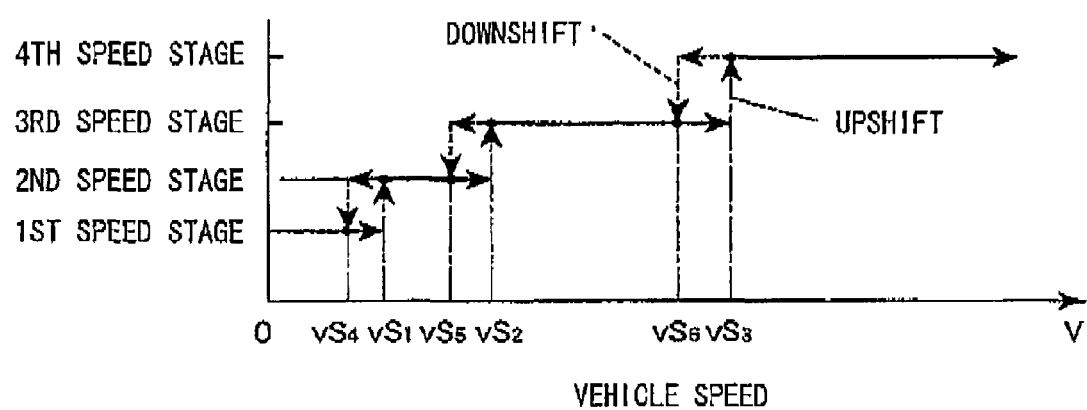
FIG. 11 is a diagram showing timing of gearshift by a vehicle speed-based control.

On the other hand, the process proceeds to step S42 when it is determined that the vehicle speed-based mode has been selected in step S41, and the gearshift of the transmission 3 is controlled in response to the vehicle speed "v" according to the predetermined characteristics as shown in FIG. 11. In FIG. 11, an upshift occurs in the order of 1st speed→2nd speed, 2nd speed→3rd speed, and 3rd speed→4th speed one by one when the vehicle speed "v" increases from 0 to vS1→vS2→vS3. When the vehicle speed "v" decreases to vS6→vS5→vS4, a downshift occurs in the order of 4th speed→3rd speed, and 3rd speed→2nd speed, and 2nd speed→1st speed one by one.

Figure 12:
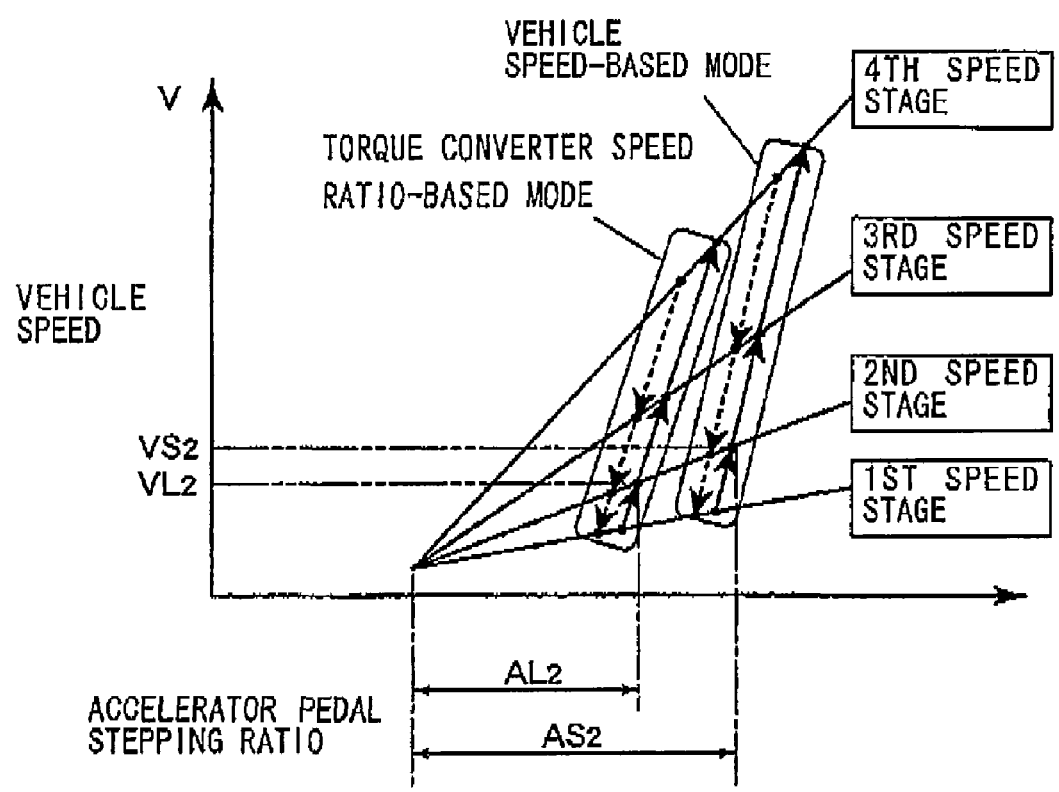
FIG. 12 is a diagram showing an example of operational characteristics of the speed change control system according to the second embodiment.

FIG. 12 is a diagram showing an example of operational characteristics of the speed change control system according to the second embodiment. For instance, the vehicle speed becomes the lowest vehicle speed vL2 when the accelerator stepping rate is AL2 (for instance, 50% of the maximum stepping amount), and there occurs an upshift of 2nd speed→3rd speed in the torque converter speed ratio-based mode. On the other hand, in the vehicle speed-based mode, the vehicle speed becomes the predetermined value vS2 when the accelerator stepping rate is AS2 (for instance, 75% of the maximum stepping amount), and there occurs an upshift of 2nd speed→3rd speed.

Therefore, if the torque converter speed ratio-based mode is selected, the transmission shifts up in a less amount of stepping on the accelerator than that in the vehicle speed-based mode, so that improvement of fuel cost can be achieved. On the other hand, if the vehicle speed-based mode is selected, the vehicle can travel at a low speed stage (2nd speed) until the accelerator is stepped on in a large amount. Therefore, it is not so much necessary for the vehicle to be decelerated by the operation of the brake pedal 32, so that, a work, for instance, loading loads on a truck can be done easily.

In the second embodiment, the torque converter speed ratio-based mode and the vehicle speed-based mode is selectable therebetween with the mode selection switch 7 as mentioned above. As a result, the improvement of fuel cost and the reduction of the engine noise can be achieved when the torque converter speed ratio-based mode is selected since an upshift can occur even if the accelerator pedal 31 is not too much stepped on. On the other hand, when the torque converter speed ratio-based mode is selected, a work of, for instance, loading loads onto a truck can be easily done since traveling at a speed stage lower than that when the torque converter speed ratio-based mode is selected can be maintained.

In the above-mentioned first embodiment, the L-mode and the H-mode are made selectable therebetween with the mode selection switch 7. However, more than two traveling modes may be provided selectably and a lowest vehicle speed upon upshifts may be set for each mode. Moreover, the lowest vehicle speed may be changed not by the operation of the mode selection switch 7 but by, for instance, inputting numerical values. The traveling mode may not be made selectable. In this case, it is only necessary to set the lowest vehicle speed for shifting up as a single value. Although the predetermined values "eu", "ed" in the torque converter speed ratio-based control are made constant, for instance, the predetermined values "eu", "ed" may be set for each speed stage, and the predetermined values may be variable. In the second embodiment, plural vehicle speed-based modes may be set. In such cases, the predetermined values sV1 to sV6 may be changed according to the respective modes.

In the configuration shown in FIG. 7 and FIG. 11, upshifts occur if the conditions in step S11 to step S14 are established when the torque converter speed ratio "e" is equal to or more than the predetermined value "eu". However, conditions different from those in step S11 to step S14 may be determined and upshifts may be achieved when the determined conditions are established. Different processing may be adopted for a different traveling mode upon shifting up. Moreover, a downshift of 2nd speed→1st speed occurs if the conditions in step S21, and steps S23 to step S25 are established when the torque converter speed ratio "e" is equal to or less than the predetermined value "ed". However, conditions other than those in step S21 and step S23 to step S25 may be determined and downshifts may occur when the determined conditions are established. That is, the processing in the controller 10 is not limited to the one mentioned above.

In the above-mentioned embodiments, the transmission 3 through which gearshifts in the range of 1st speed to 4th speed can be achieved is used. However, there may be used a transmission that permits gearshifts in the range of 5th or higher speed or of 3rd or lower speed. In the above embodiment, explanation has been made on the example in which the present invention is applied to the speed change control system for a wheel loader. However, the present invention is also applicable to speed change control systems for other industrial vehicles such as dump trucks and fork lifts.

Namely, as long as the features and functions of the present invention are realized, the speed change control system according to the present invention is not limited to the examples presented in the above-mentioned embodiments.

This application is based on Japanese Patent Application No. 2006-323031 (filed on Nov. 30, 2006), and the content there of is incorporated herein by reference.

The invention claimed is:

1. A speed change control system for industrial vehicle, comprising:
    a speed ratio detecting unit that detects a speed ratio of speeds of an input shaft and of an output shaft of a torque converter;
    a torque converter speed ratio-based speed changer that shifts up or shifts down a speed stage of a transmission in response to the detected speed ratio;
    a determination unit that determines an upshift condition is established when the detected speed ratio is equal to or greater than an upshift determination threshold, and determines a downshift condition is established when the detected speed ratio is equal to or smaller than a downshift determination threshold which is smaller than the upshift determination threshold;
    a vehicle speed detection unit that detects a vehicle speed;
    a speed change control unit that, when the determination unit determines that the upshift condition is established, permits an upshift by the torque converter speed ratio-based speed changer if the vehicle speed detection unit is equal to or higher than a predetermined value, and prohibits the upshift by the torque converter speed ratio-based speed changer if the vehicle speed detected by the vehicle speed detection unit is lower than the predetermined value;
    a clutch cutting mechanism that releases a clutch for traveling when a brake pedal is depressed to a predetermined extent or more, and connects the clutch for traveling when the brake pedal is no longer depressed to the predetermined extent or more; and
    a clutch cutting detection unit that detects an operation state of the clutch cutting mechanism, wherein:
    the speed change control unit permits the upshift when a connection of the clutch is detected by the clutch cutting detection unit, and prohibits the upshift when a release of the clutch is detected by the clutch cutting detection unit.

2. A speed change control system for industrial vehicle according to claim 1, further comprising:
    a mode selection unit that selects any one of a first gearshift mode and a second gearshift mode, wherein:
    the speed change control unit permits the upshift provided that the vehicle speed detected by the vehicle speed detection unit is equal to or higher than a first predetermined value when the first gearshift mode is selected by the mode selection unit, and permits the upshift provided that the vehicle speed detected by the vehicle speed detection unit is equal to or higher than a second predetermined value, which is larger than the first predetermined value, when the second gearshift mode is selected by the mode selection unit.

3. A speed change control system for industrial vehicle according to claim 1, further comprising:
    a vehicle speed-based speed changer that shifts up or shifts down the speed stage of the transmission in response to the detected vehicle speed;
    a mode selection unit that selects any one of a first gearshift mode and a second gearshift mode; and
    the speed change control unit being one that performs shifting by the torque converter speed ratio-based speed changer if the first gearshift mode is selected by the mode selection unit, and performs shifting by the vehicle speed-bad speed changer if the second gearshift mode is selected by the mode selection unit.

4. A speed change control system for industrial vehicle according to claim 1, further comprising:
    a lowest speed stage selection unit that selects any one of a mode whose lowest speed stage is a 1st speed and a mode whose lowest speed stage is a 2nd speed, wherein:
    the speed change control unit limits the lowest speed stage of the transmission according to the mode selected by the lowest speed stage selection unit.

5. A speed change control system for industrial vehicle according to claim 1, further comprising:
    an accelerator operation amount detection unit that detects an operation amount of an accelerator pedal, wherein:
    for permitting a downshift to 1st speed the speed change control unit requires that the operation amount of stepping on of the accelerator pedal equal to or more than a predetermined amount is detected by the accelerator operation amount detection unit.

6. A speed change control system for industrial vehicle according to claim 1, further comprising:
    a start determination unit that determines whether the vehicle is in a startable state, wherein:
    the speed change control unit controls the transmission to a 2nd speed when the start determination unit determines that the vehicle is in the startable state.

7. A speed change control system for industrial vehicle, comprising:

a speed ratio detecting unit that detects a speed ratio of speeds of an input shaft and of an output shaft of a torque converter;
a torque converter speed ratio-based speed changer that shifts up or shifts down a speed stage of a transmission in response to the detected speed ratio;
a determination unit that determines an upshift condition is established when the detected speed ratio is equal to or greater than an upshift determination threshold, and determines a downshift condition is established when the detected speed ratio is equal to or smaller than a downshift determination threshold which is smaller than the upshift determination threshold;
a vehicle speed detection unit that detects a vehicle speed;
a speed change control unit that, when the determination unit determines that the upshift condition is established, permits an upshift by the torque converter speed ratio-based speed changer if the vehicle speed detected by the vehicle speed detection unit is equal to or higher than a predetermined value, and prohibits the upshift by the torque converter speed ratio-based speed changer if the vehicle speed detected by the vehicle speed detection unit is lower than the predetermined value; and
a braking detection unit that detects an operation of a braking device for traveling, wherein:
the speed change control unit limits the lowest speed stage of the downshift by the torque converter speed ratio-based speed changer to a 2nd speed when the operation of the braking device is detected by the braking detection unit.

8. A speed change control system for industrial vehicle according to claim 5, wherein:
for permitting a downshift to the 1st speed the speed change control unit requires that the operation amount of stepping on of the accelerator pedal equal to or more than the predetermined amount is continued for a predetermined time.

9. A speed change control system for industrial vehicle according to claim 1, further comprising:
an accelerator operation amount detection unit that detects an operation amount of an accelerator pedal, wherein:
for permitting an upshift the speed change control unit requires that the operation amount of stepping on of the accelerator pedal equal to or more than a predetermined amount is detected by the accelerator operation amount detection unit, and prohibits the upshift if the operation amount of stepping on of the accelerator pedal equal to or more than the predetermined amount is not detected.

10. A speed change control system for industrial vehicle according to claim 9, wherein:
for permitting the upshift the speed change control unit requires that the operation amount of stepping on of the accelerator pedal equal to or more than the predetermined amount is continued for a predetermined time.

11. A speed change control system for industrial vehicle according to claim 9, wherein:
the speed change control unit performs a downshift regardless of the speed ratio detected by the speed ratio detection unit when the operation amount of stepping on of the accelerator pedal equal to or more than the predetermined amount is not detected and the vehicle speed detected by the vehicle speed detection unit is equal to or lower than a set vehicle speed.

12. A speed change control system for industrial vehicle according to claim 11, wherein:
the speed change control unit limits a lowest speed stage upon the downshift to a 2nd speed.

13. A speed change control system for an industrial vehicle, comprising:
a speed ratio detecting unit that detects a speed ratio of speeds of an input shaft and of an output shaft of a torque converter;
a torque converter speed ratio-based speed changer that shifts up or shifts down a speed stage of a transmission in response to the detected speed ratio;
a determination unit that determines an upshift condition is established when the detected speed ratio is equal to or greater than an upshift determination threshold, and determines a downshift condition is established when the detected speed ratio is equal to or smaller than a downshift determination threshold which is smaller than the upshift determination threshold;
a vehicle speed detection unit that detects a vehicle speed; and
a speed change control unit that, when the determination unit determines that the upshift condition is established, permits an upshift by the torque converter speed ratio-based speed changer if the vehicle speed detected by the vehicle speed detection unit is equal to or higher than a predetermined value, and prohibits the upshift by the torque converter speed ratio-based speed changer if the vehicle speed detected by the vehicle speed detection unit is lower than the predetermined value.

14. A speed change control system for industrial vehicle, comprising:
a speed ratio detecting unit that detects a speed ratio of speeds of an input shaft and of an output shaft of a torque converter;
a torque converter speed ratio-based speed changer that shifts up or shifts down a speed stage of a transmission in response to the detected speed ratio;
a determination unit that determines an upshift condition is established when the detected speed ratio is equal to or greater than an upshift determination threshold, and determines a downshift condition is established when the detected speed ratio is equal to or smaller than a downshift determination threshold which is smaller than the upshift determination threshold;
a vehicle speed detection unit that detects a vehicle speed; and
a speed change control unit that, when the determination unit determines that the upshift condition is established, permits an upshift by the torque converter speed ratio-based speed changer if the vehicle speed detected by the vehicle speed detection unit is equal to or higher than a predetermined value, and prohibits the upshift by the torque converter speed ratio-based speed changer if the vehicle speed detected by the vehicle speed detection unit is lower than the predetermined value;
a clutch cutting mechanism that releases a clutch for traveling when a brake pedal is depressed to a predetermined extent or more, and connects the clutch for traveling when the brake pedal is no longer depressed to the predetermined extent or more;
a clutch cutting detection unit that detects an operation state of the clutch cutting mechanism; and
a braking detection unit that detects an operation of a braking device for traveling, wherein:
the speed change control unit permits the upshift when a connection of the clutch is detected by the clutch cutting detection unit, and prohibits the upshift when a release of the clutch is detected by the clutch cutting detection unit; and the speed change control unit limits the lowest speed stage of the downshift by the torque converter speed ratio-based speed changer to a $2^{nd}$ speed when the operation of the braking device is detected by the braking detection unit.

15. An industrial vehicle comprising:

four tires;

a body supported by the tires, the body being bendable;

a front side frame and a rear side frame that constitute the body;

an engine compartment provided in a rear part of the rear side frame;

an operator's cab provided in a front part of the rear side frame;

an engine compartment provided in a rear part of the rear side frame;

an arm provided rotatably in a vertical direction with respect to the front side frame;

a bucket provided rotatably at a front end of the arm; and a speed change control system according to claim 1.

* * * * *